(12) United States Patent
Tachibana et al.

(10) Patent No.: US 9,916,004 B2
(45) Date of Patent: Mar. 13, 2018

(54) DISPLAY DEVICE

(71) Applicant: Sony Mobile Communications Inc., Tokyo (JP)

(72) Inventors: Makoto Tachibana, Tokyo (JP); Takashi Shiina, Kanagawa (JP); Tetsuya Naruse, Kanagawa (JP); Yuichi Shirai, Tokyo (JP); Chikashi Yajima, Kanagawa (JP); Susumu Takatsuka, Tokyo (JP)

(73) Assignee: SONY MOBILE COMMUNICATIONS INC., Tokyo (JP)

( * ) Notice: Subject to any disclaimer, the term of this patent is extended or adjusted under 35 U.S.C. 154(b) by 543 days.

(21) Appl. No.: 14/011,082

(22) Filed: Aug. 27, 2013

(65) Prior Publication Data

US 2014/0062842 A1 Mar. 6, 2014

Related U.S. Application Data

(60) Provisional application No. 61/694,063, filed on Aug. 28, 2012.

(51) Int. Cl.
*G06F 3/01* (2006.01)
*H04M 1/60* (2006.01)
*H04M 1/725* (2006.01)
*G06F 1/16* (2006.01)
*G06F 3/0346* (2013.01)

(52) U.S. Cl.
CPC ............ *G06F 3/012* (2013.01); *G06F 1/1694* (2013.01); *G06F 3/0346* (2013.01); *H04M 1/6058* (2013.01); *H04M 1/72569* (2013.01); *H04M 1/6066* (2013.01)

(58) Field of Classification Search
CPC ...................................................... G06F 3/012
See application file for complete search history.

(56) References Cited

U.S. PATENT DOCUMENTS

| | | | | |
|---|---|---|---|---|
| 2006/0241883 A1* | 10/2006 | Kwon | ................... | G01C 17/38 702/92 |
| 2011/0187640 A1* | 8/2011 | Jacobsen | ............. | G02B 27/017 345/156 |
| 2011/0298829 A1* | 12/2011 | Stafford | ............... | G06K 9/3208 345/659 |
| 2012/0114132 A1* | 5/2012 | Abrahamsson | ...... | H04R 1/1016 381/74 |
| 2012/0317825 A1* | 12/2012 | Ohta | ..................... | G01C 17/28 33/301 |

FOREIGN PATENT DOCUMENTS

JP      2010-086192      4/2010

\* cited by examiner

*Primary Examiner* — David Tung
(74) *Attorney, Agent, or Firm* — Oblon, McClelland, Maier & Neustadt, L.L.P.

(57) ABSTRACT

An information processing apparatus including a communication interface configured to be connected to an external posture detecting device to be worn by a user; a display configured to rotatably display a display image; and circuitry configured to control a rotation angle of the image displayed by the display based on posture information received from the external posture detecting device.

7 Claims, 23 Drawing Sheets

FIG. 9A
FIG. 9B
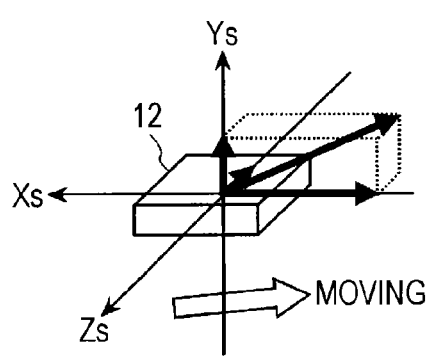
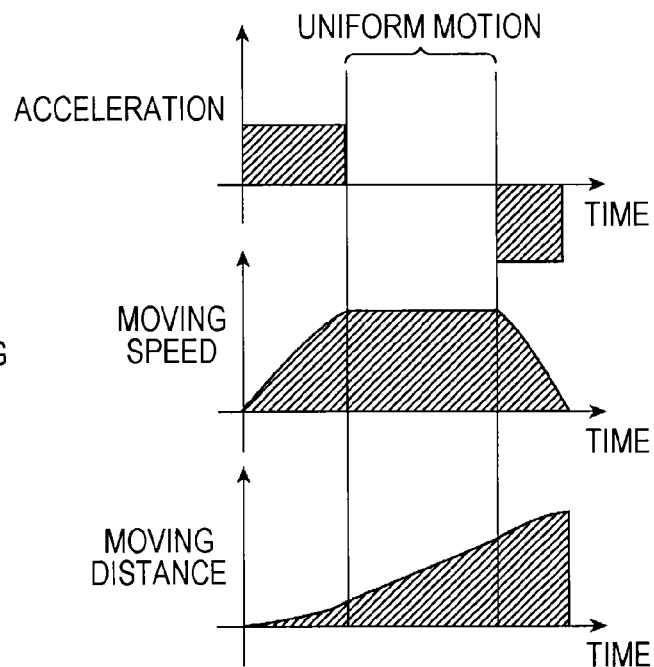

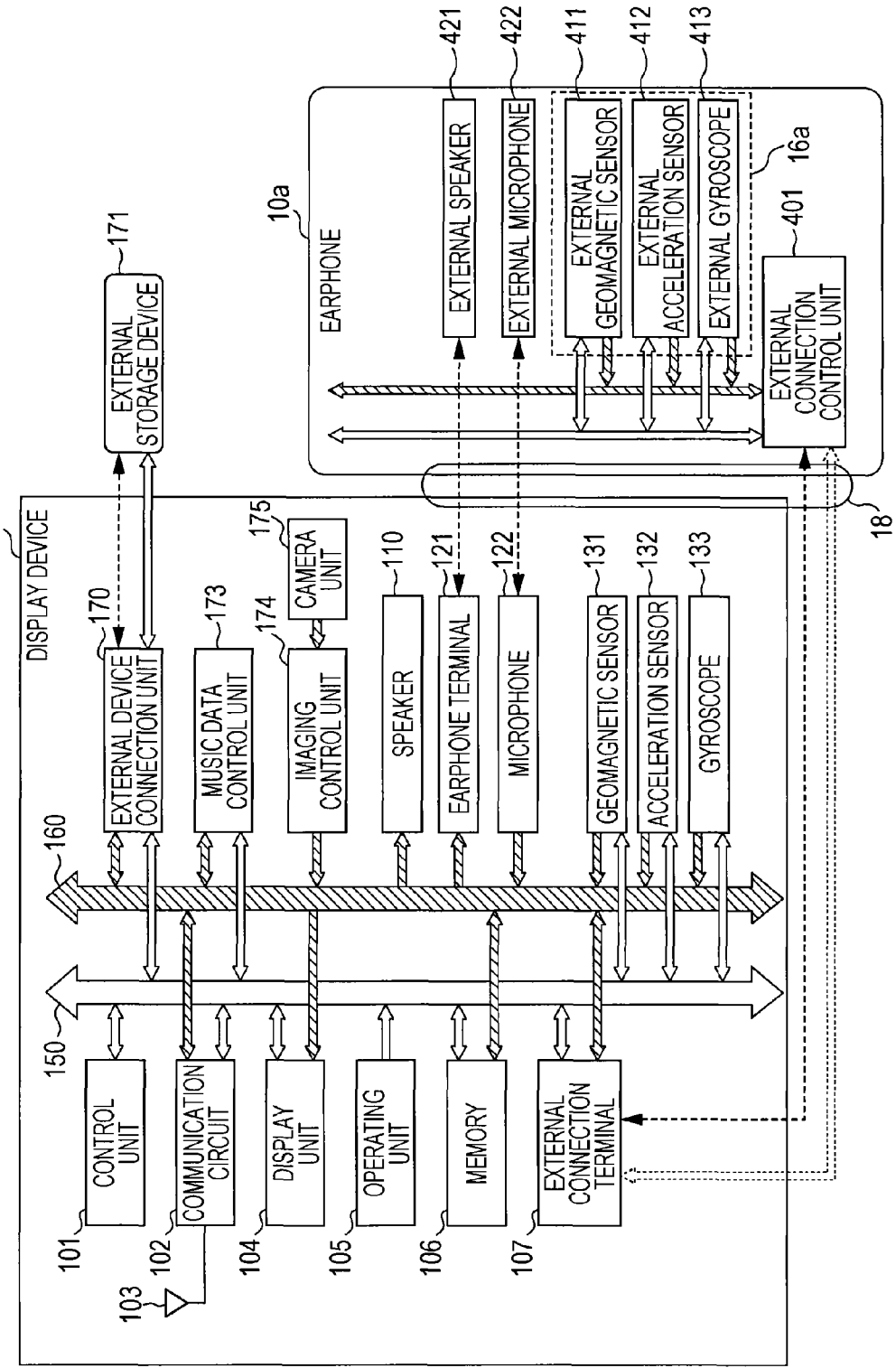

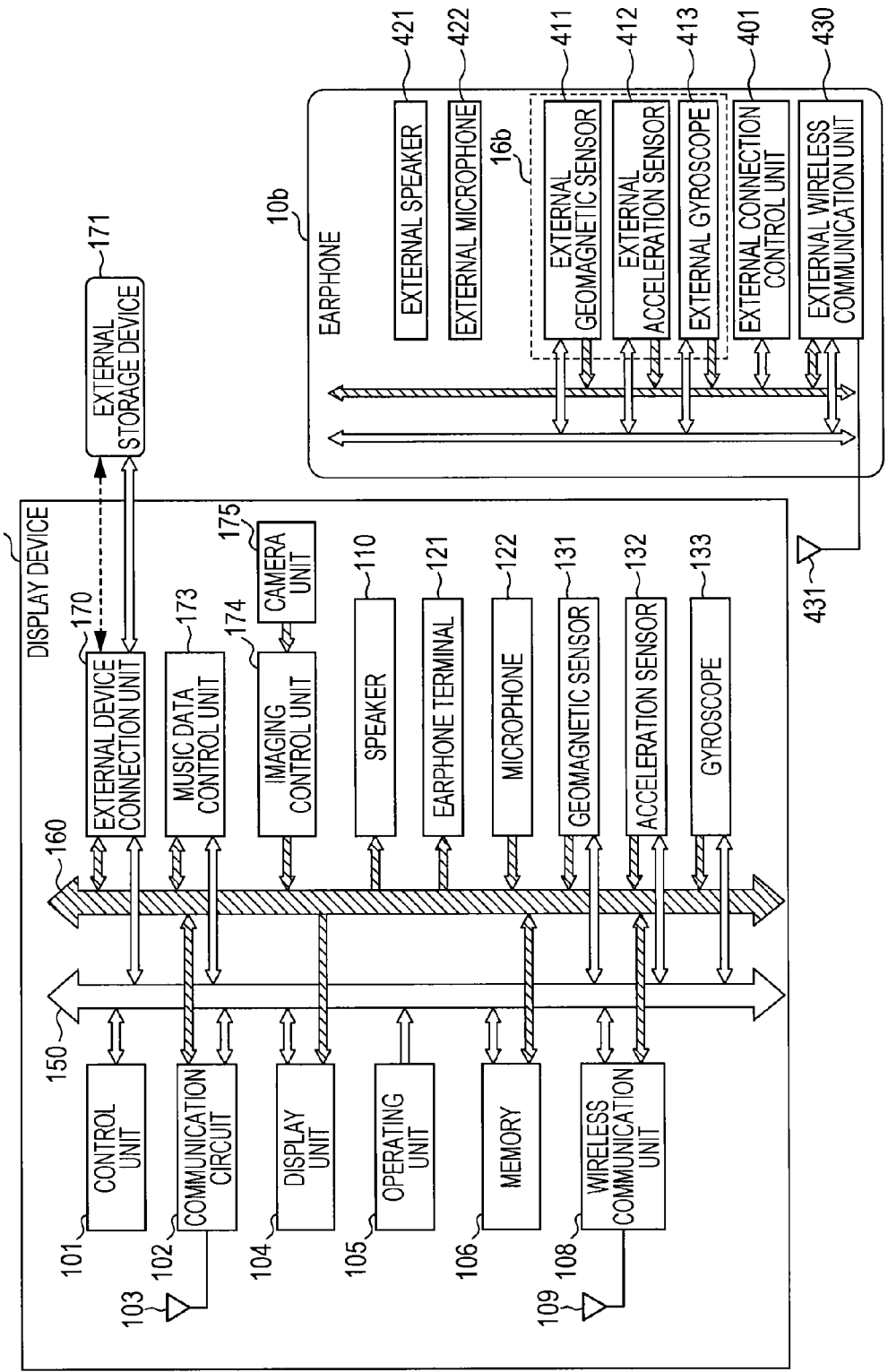

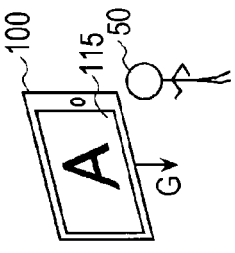
FIG. 17J
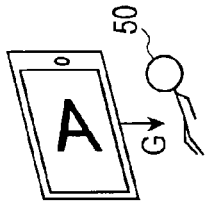
FIG. 17K
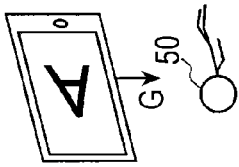
FIG. 17L
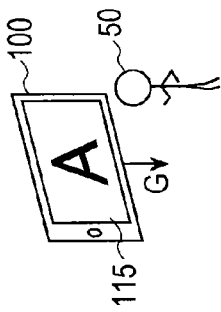
FIG. 17G
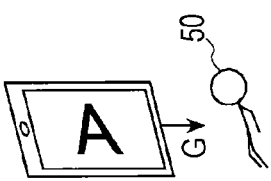
FIG. 17H
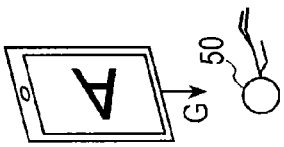
FIG. 17I
FIG. 17D
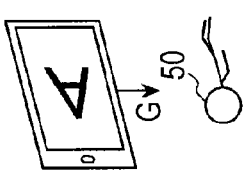
FIG. 17E
FIG. 17F
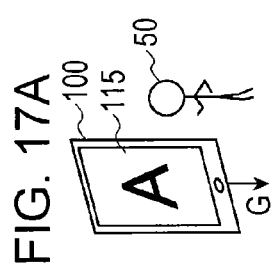
FIG. 17A
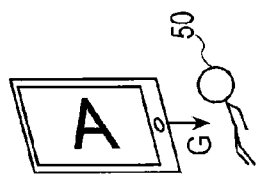
FIG. 17B
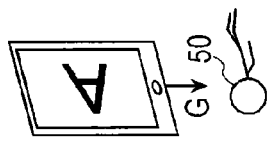
FIG. 17C

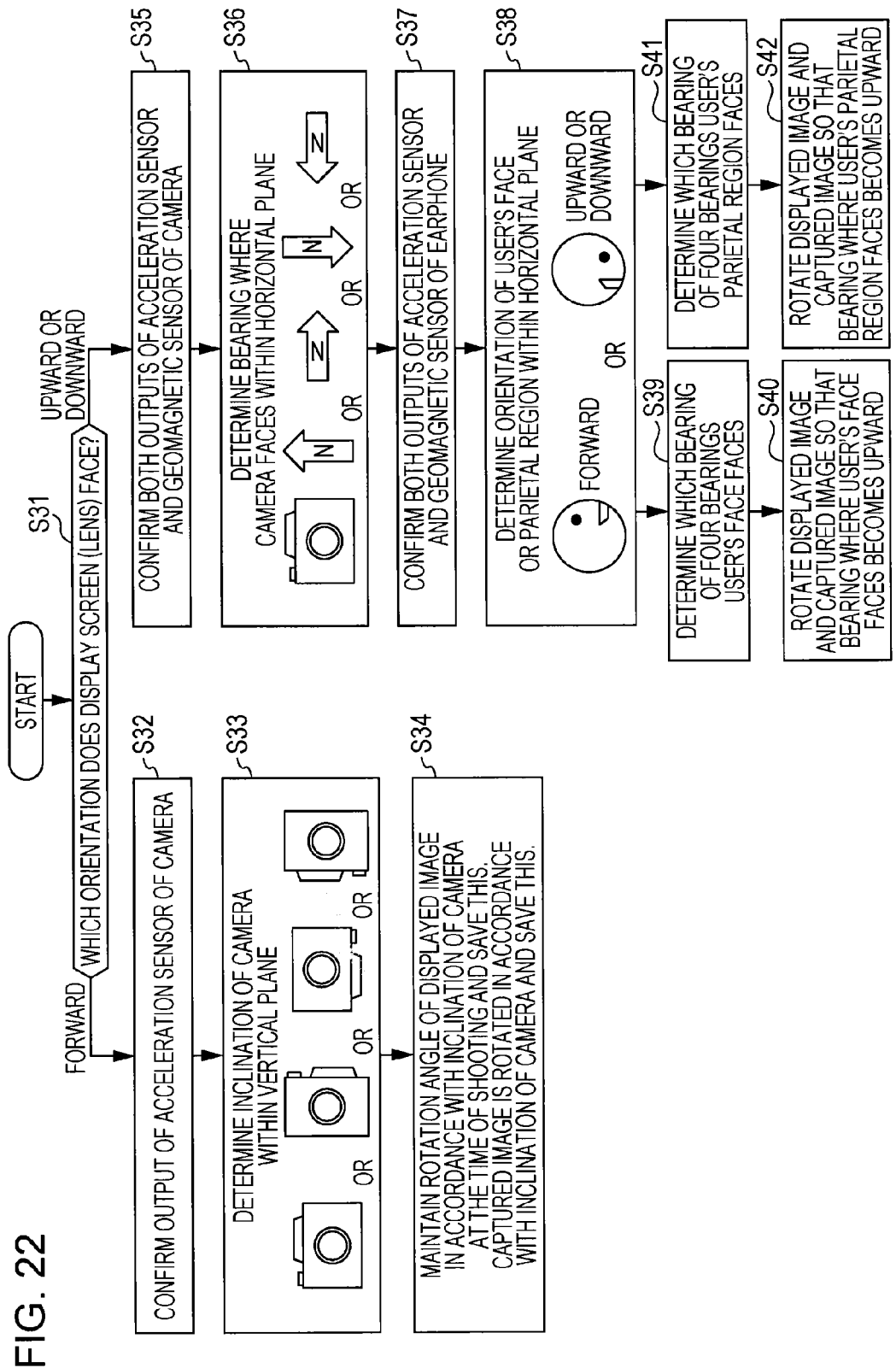

DISPLAY DEVICE

CROSS REFERENCE TO RELATED APPLICATION

The present application claims the benefit of the earlier filing date of U.S. Provisional Patent Application Ser. No. 61/694,063 filed on Aug. 28, 2012, the entire contents of which is incorporated herein by reference.

BACKGROUND

Field of the Disclosure

The present disclosure relates to a display device which is available along with a headphone having a posture detection function.

Description of Related Art

In recent years, personal digital assistants called smart phones or tablets, which have rapidly spread, generally include a sensor configured to detect attitude of the device, such as an acceleration sensor or the like.

With such a personal digital assistant, the current attitude of the device is confirmed by the sensor, and the operation of the device and the operation of an application are controlled according to the attitude thereof.

With any of the operations in conventional personal digital assistants, only a situation has been assumed wherein a user is standing or sitting straight up (vertically). That is to say, with those techniques, the orientation/inclination of the device has been able to be estimated, but the user's body pose (posture) has not been able to be estimated. For example, there has been a case where in the event that the user uses the device in a lying state (in a state lying on his/her side, or in a state lying on his/her back), the user interface (UI) is changed in an orientation where the user does not intend, which makes the device hard to use for the user.

As for such a conventional problem, the present applicant has proposed a technique to prevent, with a personal digital assistant which reflects inclination of the casing on the user interface, change in the posture of a user gripping the casing, from causing inconvenience regarding the user interface. To this end, this technique prevents the user interface to use predetermined inclination of the casing from using inclination of the casing while movement of the gravity of the casing of the personal digital assistant is detected. This is a technique to discriminate whether or not the inclination of the casing has been caused due to change in the user's posture, and to suppress, in the event that the inclination of the casing has been caused due to change in the user's posture, the operation of the user interface.

SUMMARY

However, the above-mentioned prior art is also not a technique to directly detect the user's posture, which has failed to suitably handle a wider combination between various attitudes of the device and the user's various postures.

The inventor recognizes, with such a background, necessity to perform control of a more suitable display interface according to both of the attitude of the device and the user's posture.

According to an exemplary embodiment, the disclosure is directed to an information processing apparatus including a communication interface configured to be connected to an external posture detecting device to be worn by a user; a display configured to rotatably display a display image; and circuitry configured to control a rotation angle of the image displayed by the display based on posture information received from the external posture detecting device.

According to the present embodiment, control of a more suitable display interface can be performed according to both of the attitude of a display device and a user's posture.

BRIEF DESCRIPTION OF DRAWINGS

FIGS. 9A and 9B are diagrams for describing working of the acceleration sensor other than to detect a gravity vector.

FIG. 12 is a block diagram illustrating a configuration example of a display device employing a cable-connection-typed earphone according to an embodiment of the present disclosure.

FIG. 13 is a block diagram a configuration example of a display device employing a wireless-connection-typed earphone.

FIGS. 17A to 17L are diagrams illustrating, in a state in which a user is facing in a state in which his/her upper body is erected or in a lying state as to display device disposed of which the display screen is erected in the vertical direction, various attitude and posture relations between the display device and the user.

FIG. 22 is a diagram for more specifically describing by classifying a display control mode to be executed according to both attitudes of the camera according to an embodiment of the present disclosure and a earphone worn by a user, into cases.

DETAILED DESCRIPTION

Hereafter, embodiments of the present disclosure will be described in detail with reference to the drawings.

A display device according to an embodiment of the present disclosure is a device which is available along with a headphone (or earphones) having an attitude detection function, and controls a display-related user interface (display interface) of the display device according to the attitude of the headphone. In the event that the display device is a personal digital assistant, the display device also has the attitude detection function, and controls the user interface according to a combination of both attitudes. More specifically, the display device controls a rotation angle of a display image on the display screen.

In general, headphones are apparatuses for a user basically listening to audio, music, or the like by himself/herself by converting an acoustic signal to be output from an acoustic playing apparatus into acoustic waves (audible sound). Examples of the acoustic playing apparatus include various devices such as cellular phone terminals, music players, video players, television sets, radio receivers, electronic dictionaries, game machines, and so forth. In the event of a digital camera which is a display device having a display screen to which a headphone (or earphones) can be connected, this digital camera is also a kind of display devices.

Hereafter, a portable-typed personal display device (e.g., personal digital assistant or digital camera) with which a user can carry will be described as an acoustic playing apparatus as an example. Also, a fixed-type display device such as a television set will also be described.

A headphone according to the present Specification is connected to such a display device by cable or radio, which includes a monaural type including a single earphone, and a stereo type including a pair of earphones for right and left. An earphone is a component of the headphone to be worn so as to bring a speaker close to the ear on one side of the user.

Figure 1A:
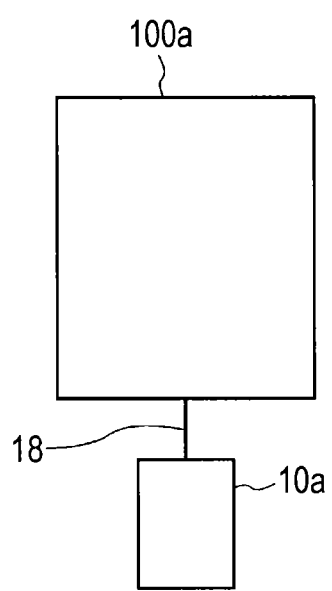
FIGS. 1A and 1B are diagrams illustrating schematic configurations of display devices including monaural-typed headphones for cable connection and for wireless connection, respectively.
Figure 1B:
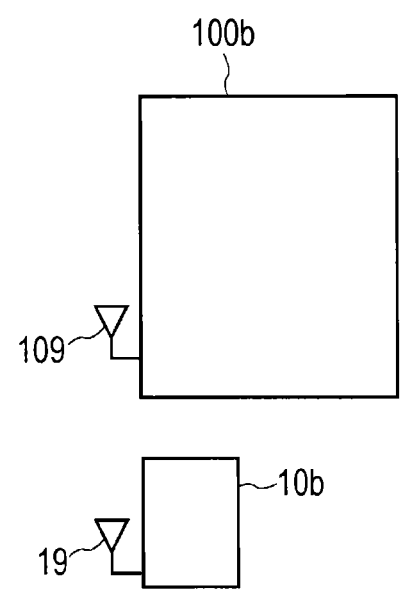
Figure 2A:
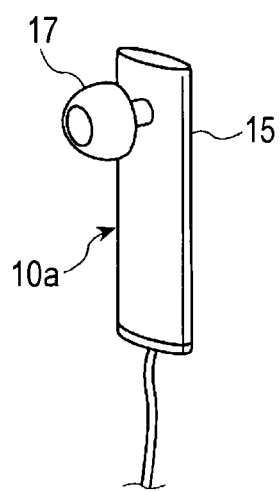
FIGS. 2A and 2B are diagrams illustrating external view examples of the monaural-typed headphones for cable connection and for wireless connection, respectively.
Figure 2B:
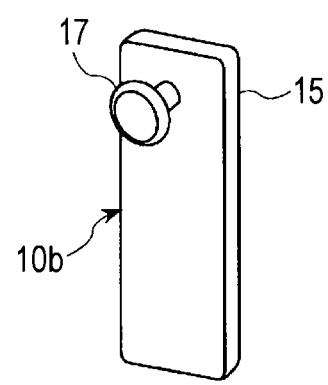

FIGS. 1A and 1B illustrate schematic configurations of display devices 100a and 100b including monaural-typed headphones for cable connection and for wireless connection, respectively. FIGS. 2A and 2B illustrate external view examples of monaural-typed headphones for cable connection and for wireless connection, respectively. The monaural-typed headphones include single earphones 10a and 10b. The earphone 10a for cable connection is connected to the corresponding display device 100a via a cable 18. The earphone 10b for wireless connection is connected to the corresponding display device 100b via a wireless connection interface. Both include a casing 15, and an ear hole insertion portion 17 protruding from the side face of this casing 15.

Figure 3A:
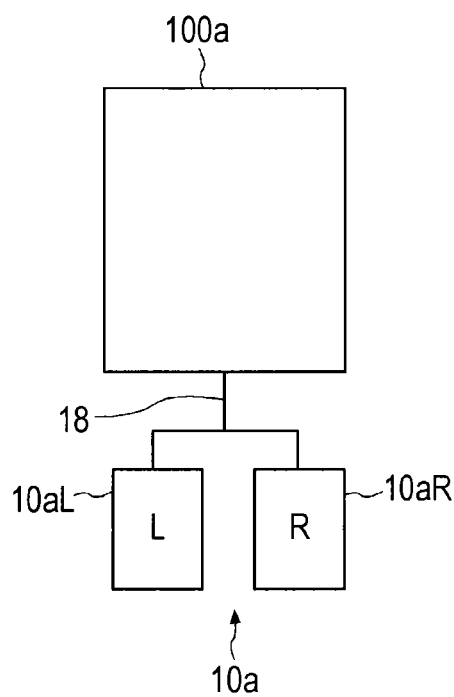
FIGS. 3A, 3B, and 3C are diagrams illustrating schematic configurations of display devices including stereo type headphones for cable connection and for wireless connection, respectively.
Figure 3B:
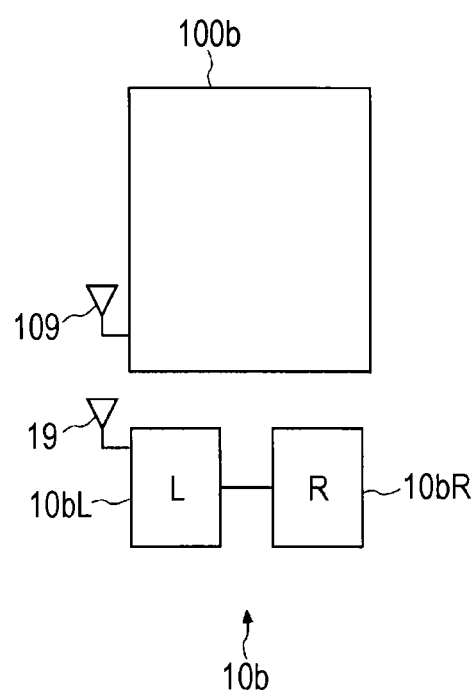
Figure 3C:
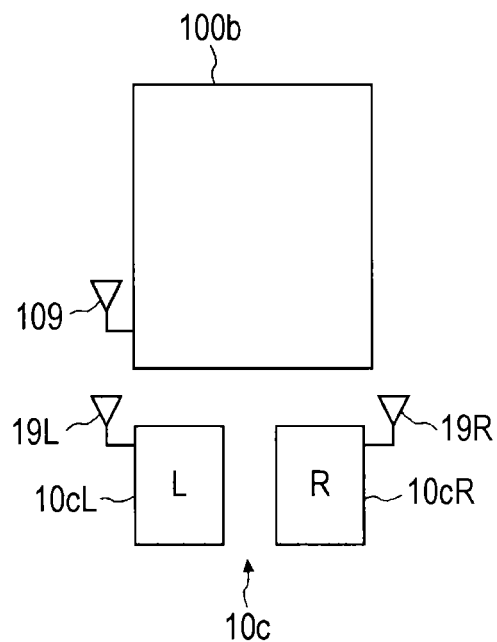

FIGS. 3A, 3B, and 3C illustrate schematic configurations of the display devices 100a and 100b including stereo type headphones for cable connection and for wireless connection, respectively. Earphones 10aL and 10aR for cable connection are connected to the corresponding display device 100a via the cable 18. The left and right earphones 10bL and 10bR are wirelessly connected to the display device 100b via an antenna 19 thereof, and an antenna 109 of the corresponding display device 100b. The earphones 10bL and 10bR may share the single antenna 19 as illustrated in FIG. 3B in the event that the earphones 10bL and 10bR are connected by a band or the like as illustrated in later-described FIGS. 4A and 4B. As illustrated in FIG. 3C, in the event that the left and right earphones 10cL and 10cR are mutually separated (independent), antennas 19L and 19R (and communication circuits) are separately included in both earphones. With the present embodiment, with a stereo type headphone, as a later-described external posture detecting unit the posture detection function thereof basically has to be provided to one of the earphones alone.

FIGS. 4A, 4B, 4C, and 4D illustrate external view examples of stereo type headphones in various modes.

Figure 4A:
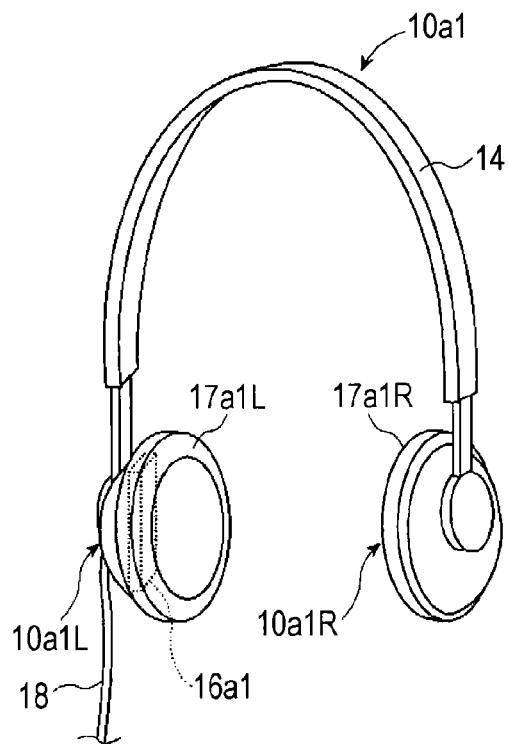
FIGS. 4A, 4B, 4C, and 4D are diagrams illustrating external view examples of stereo type headphones in various modes.

A headphone 10a1 for cable connection illustrated in FIG. 4A is connected to left and right earphones 10a1L and 10a1R by way of a headband 14. One of the earphones (here, the left earphone 10a1L) serves as an external posture detecting unit. Specifically, a sensor device 16a1 is mounted on the left side of ear pads 17a1L and 17a1R, and the cable 18 for cable connection is externally pulled out. The sensor device 16a1 houses at least a triaxial geomagnetic sensor and a triaxial acceleration sensor, detects a gravity direction using the acceleration sensor, and detects a bearing where the external posture detecting unit faces on the horizontal plane using the geomagnetic sensor. A wire (not illustrated) to communicate a signal with the other earphone (right earphone 10a1R) is internally passed through the headband 14.

Figure 4B:
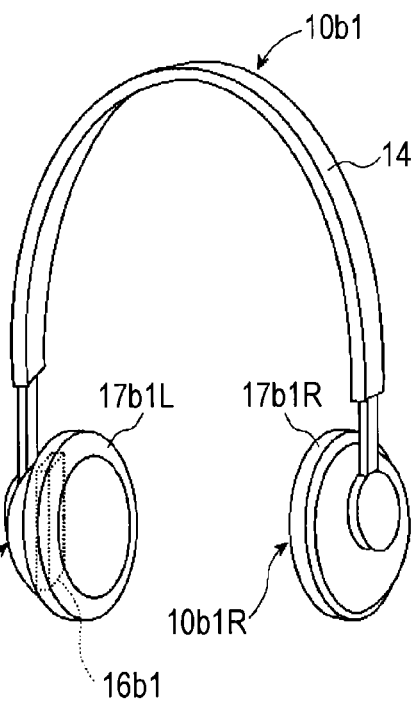

A headphone 10b1 for wireless connection illustrated in FIG. 4B is connected to left and right earphones 10b1L and 10b1R with the headband 14. With the left earphones 10b1L, in the same way as with the headphone 10a1, a sensor device 16b1 is mounted on an ear pad 17b1L thereof. A different point from the headphone 10a1 is in that the sensor device 16b1 includes a wireless communication unit (will be described later) in addition to the geomagnetic sensor 11 and acceleration sensor 12.

Figure 4C:
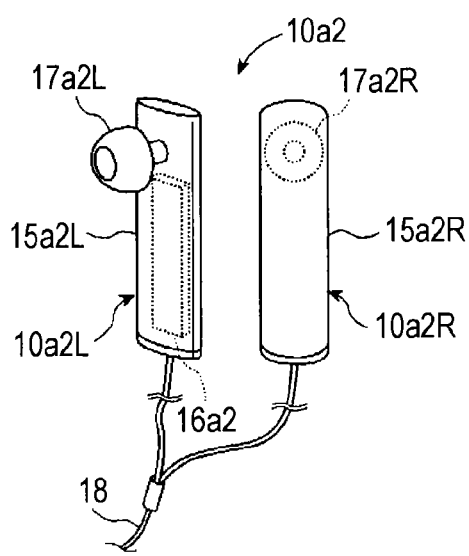
Figure 4D:
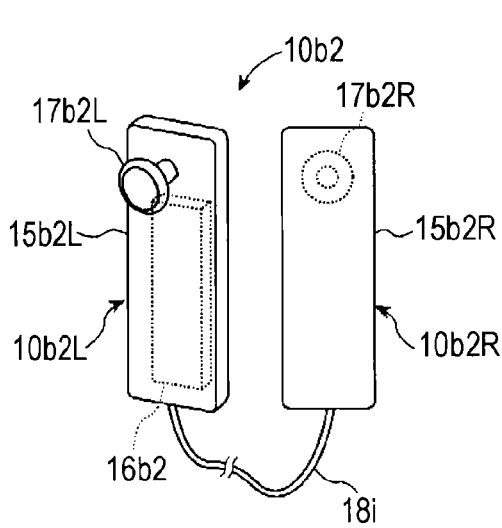

FIGS. 4C and 4D illustrate headphones (ear receivers) 10a2 and 10b2 each having ear hole insertion portions 17a2L, 17a2R, 17b2L, and 17b2R to be worn in an ear hole of the user without employing the headband, for cable connection and for wireless connection, such as those called "inner ear type" or "canal type".

The headphone 10a2 for cable connection illustrated in FIG. 4C includes casings 15a2L and 15a2R, ear hole insertion portions 17a2L and 17a2R protruding on the side face thereof, and left and right earphones 10a2L and 10a2R having the cable 18 derived from the casing bottoms thereof. At least, a sensor device 16a2 is housed in the casing 15a2L of the left earphone 10a2L. The sensor device 16a2 includes at least the geomagnetic sensor 11 and acceleration sensor 12.

The headphone 10b2 for wireless connection illustrated in FIG. 4D includes casings 15b2L and 15b2R, ear hole portions 17b2L and 17b2R protruding on the side face thereof, and left and right earphones 10b2L and 10b2R having a cable 18i which connects the casings thereof. At least, a sensor device 16b2 is housed in the casing 15b2L of the left earphone 10b2L. The sensor device 16b2 includes at least the geomagnetic sensor 11, acceleration sensor 12, and a wireless communication unit (will be described later). In the event that a wireless communication unit is independently included in both of the earphones 10b2L and 10b2R, the cable 18i may be omitted (corresponding to FIG. 3C).

In addition, though not illustrated in the drawing, the present embodiment may be applied to a neckband type headphone having a band to be worn around the neck, or a behind-the-ear type headphone including a behind-the-ear portion instead of the band, as modifications of the headband type.

Hereafter, though the present embodiment will be described with the headphones of the types illustrated in FIGS. 2A, 2B, 4C, and 4D as an example, the same description may be applied to other types of headphones.

Figure 5A:
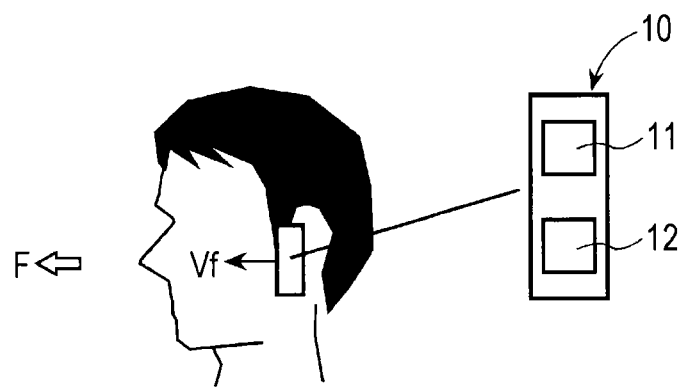
FIGS. 5A and 5B are diagrams illustrating states in which a user wears a headphone according to the present embodiment.
Figure 5B:
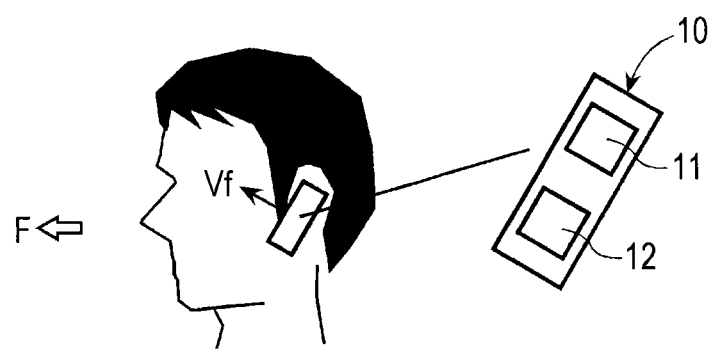

FIGS. 5A and 5B illustrate a state in which the user wears the headphone according to the present embodiment. This example is equivalent to a state in which a single earphone is worn in the left ear in the case of the monaural type, and is equivalent to a state in which a pair of earphones are worn on both ears in the case of the stereotype. Hereafter, in the event that the left and right earphones 10L and 10R do not particularly have to be distinguished, these will simply be referred to as earphone 10.

The earphone 10 may be rotated in a certain angle range with a generally straight line connecting both ears as an axis even in a state worn on the user's head. FIGS. 5A and 5B illustrate a state in which the earphone 10 is worn on the user's head with a different rotation angle. As illustrated in the drawing, the user's facial orientation F may coincide with the forward direction (forward vector Vf) of the earphone 10, or may not.

With the earphone 10 worn on the user's head as illustrated in FIGS. 5A and 5B, a direction where the user's face faces (i.e., facial orientation F) may be determined as follows. Specifically, as illustrated in FIG. 5A, in the event that the user has worn the earphone 10 so as to match the longitudinal direction to a direction generally vertical to the ground (vertical direction), the forward vector Vf of the earphone 10 generally coincides with the facial orientation F. On the other hand, even in the event that inclination (wearing angle error) has occurred on the earphone 10 according to how to wear the headphones 10 on the head as illustrated in FIG. 5B, the actual orientation of the user's face F is obtained by correcting the forward vector Vf of the earphone 10 using the acceleration sensor 12.

The earphone 10 according to the present embodiment (at least one of both earphones in the case of stereo) serves as a posture detecting unit (external posture detecting unit) configured to detect the current user's head state, and specifically, the user's facial orientation F, i.e., a direction (orientation) where the front (face portion) of the head faces. With the present embodiment, description will be made with a case where the earphone (earphone for the left ear in the example in the drawing) servers as the external posture detecting unit, as an example.

The external posture detecting unit according to the present embodiment includes, as described above, at least the triaxial geomagnetic sensor 11 and triaxial acceleration sensor 12 disposed near the ear at the time of wearing. In the case of wireless connection, a wireless communication unit is further provided to that end.

Figure 6:
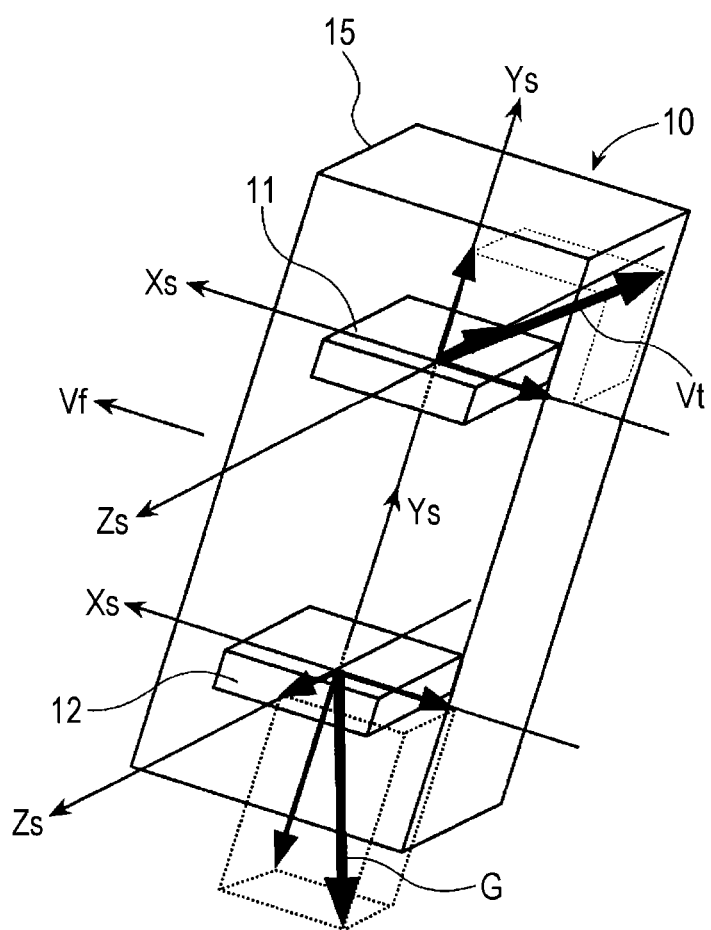
FIG. 6 is a diagram for describing working of each of a geomagnetic sensor and an acceleration sensor housed in (the casings of) the earphones according to an embodiment of the present disclosure.

FIG. 6 is a diagram for describing working of each of the geomagnetic sensor 11 and acceleration sensor 12 housed in (the casing 15 of) the earphone 10.

According to the triaxial geomagnetic sensor 11, a geomagnetic direction (bearing) in the current attitude of (the casing 15 of) the housed earphone 10, i.e., a geomagnetic vector Vt is found.

Here, for convenience of description, let us say that three axes mutually orthogonal in a three-dimensional coordinate system (sensor coordinate system) unique to the earphone 10 (i.e., unique to the sensor) are taken as Xs axis, Ys axis, and Zs axis. The Xs axis is equivalent to an anteroposterior direction of the earphone 10, and the Ys axis is equivalent to the up-and-down direction of the earphone 10, and the Zs axis is an axis orthogonal to the Xs and Ys axes. The Zs axis is generally equivalent to a direction along a straight line connecting the user's both ears at the time of the user wearing the earphone 10. In the case that the earphone 10 is the earphone 10L to be worn on the user's left ear, a contact portion (ear hole insertion portion) for the ear is disposed on the side face of the negative direction of the Zs axis of the casing 15. Conversely, in the case of the earphone 10R to be worn on the user's right ear, the contact portion for the ear is disposed on the side face of the positive direction of the Zs axis of the casing 15. The Xs axis is orthogonal to both of the Ys and Zs axes. With this example, let us say that the positive direction of the Xs axis coincides with the forward vector Vf of the earphone 10. The geomagnetic vector Vt may generally be decomposed to components of the axes of Xs, Ys, and Zs as illustrated in the drawing.

According to the triaxial acceleration sensor 12, with a static state, the direction of the gravity in the current attitude of (the casing 15 of) the earphone 10 in which this sensor is housed, i.e., a gravity vector G is found. The gravity vector G coincides with a vertically downward direction. The gravity vector G may also be decomposed to components of the axes of Xs, Ys, and Zs as illustrated in the drawing.

The triaxial geomagnetic sensor 11 and triaxial acceleration sensor 12 are employed in this way, whereby the attitude (inclination) of the earphone 10 within three-dimensional space where (the casing 15 of) the earphone 10 is disposed can be detected.

Figure 7A:
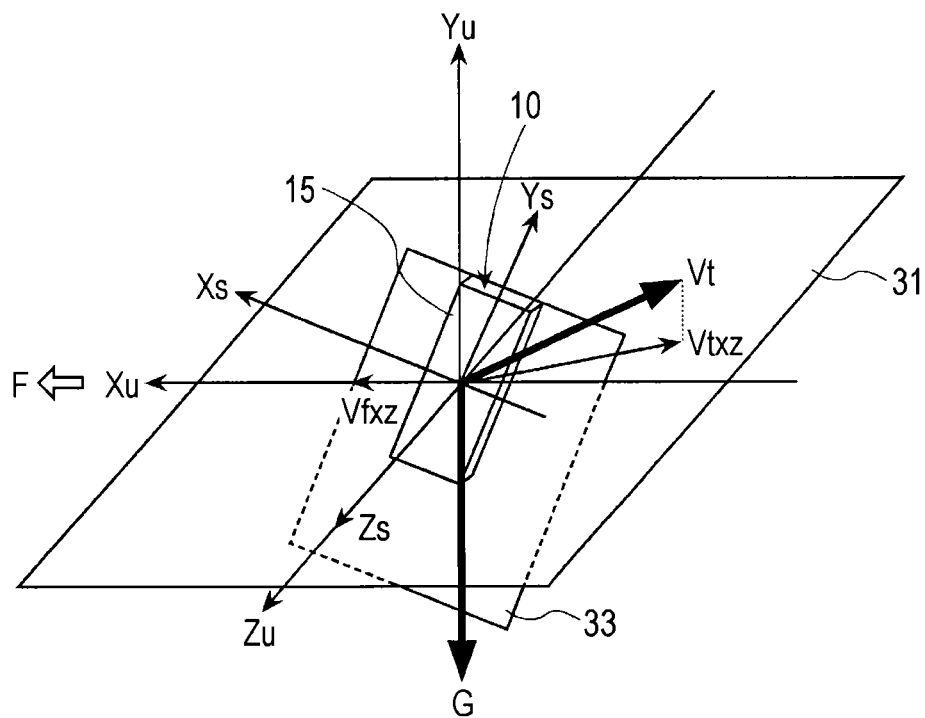
FIGS. 7A and 7B are diagrams for describing various vector relations and various angles in a three-dimensional spatial coordinate system where the earphone is disposed.
Figure 7B:
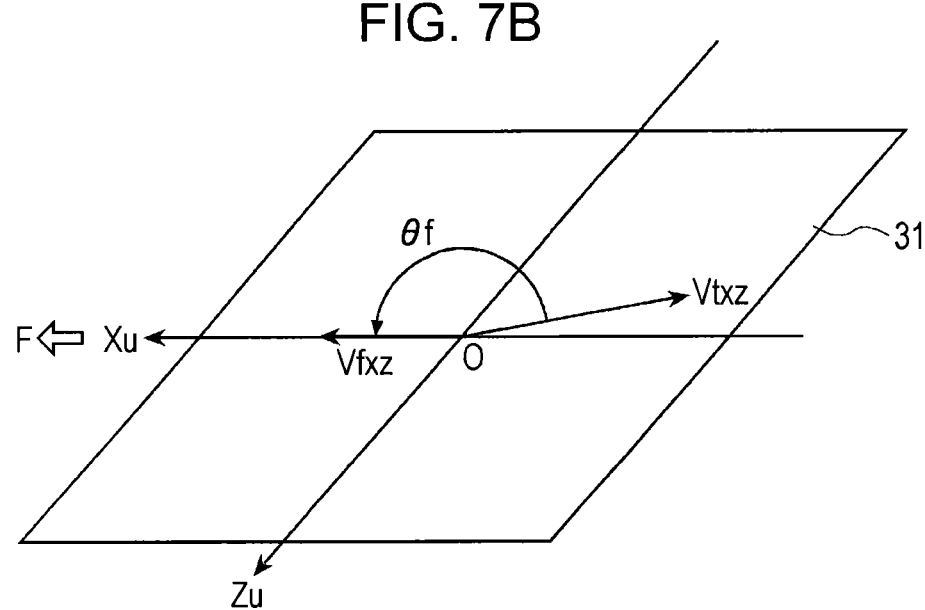

FIGS. 7A and 7B are diagrams for describing various vector relations and various angles in a three-dimensional space coordinate system where the earphone is disposed.

As illustrated in FIG. 7A, let us say that axes orthogonal to each other in the three-dimensional space where the earphone 10 is disposed, i.e., the three-dimensional space coordinate system where the user is positioned are taken as Xu axis, Yu axis, and Zu axis. This coordinate system will be referred to as user coordinate system (Xu, Yu, Zu) in distinction from the sensor coordinate system (Xs, Ys, Zs) as described above. The Xu axis is equivalent to an anteroposterior direction of the user, the Yu axis is equivalent to the up-and-down direction of the user, and the Zu axis is an axis orthogonal to the Xu and Yu axes. Variables to be used for both coordinate systems will be distinguished by subscripts s (sensor) and u (user). The Yu axial negative direction is along the gravity vector G. A plane orthogonal to the gravity vector G is an Xu-Zu plane, and is equivalent to a horizontal plane 31 within space where the user is positioned. For convenience, let us say that the Zu axis coincides with the Zs axis.

As described above, when the user wears the earphone 10, the up-and-down direction (longitudinal direction) of the earphone 10 does not necessarily coincide with the vertical direction. With the example in FIG. 7A as well, an example is illustrated wherein the vertical direction (direction along the Yu axis) does not coincide with the Ys axial direction of the sensor coordinate system.

As illustrated in FIG. 7A, for convenience, a plane 33 including the side face of the casing 15 of the earphone 10 (face that is in contact with the user's ear) is assumed, the direction of a straight line that this plane 33 intersects with the horizontal plane 31 (vector Vfxz) may be determined to be the user's facial orientation F. The facial orientation F thus obtained may include some level of error as to the accurate facial orientation according to a wearing level of the earphone. However, with a number of applications, this error can be conceived as an allowable range. As illustrated in FIG. 7B, the bearing of the facial orientation F is determined with an angle θf the user's current facial orientation F as to the reference orientation vector Vtxz on the horizontal plane 31 equivalent to the Xu-Zu plane.

Figure 8A:
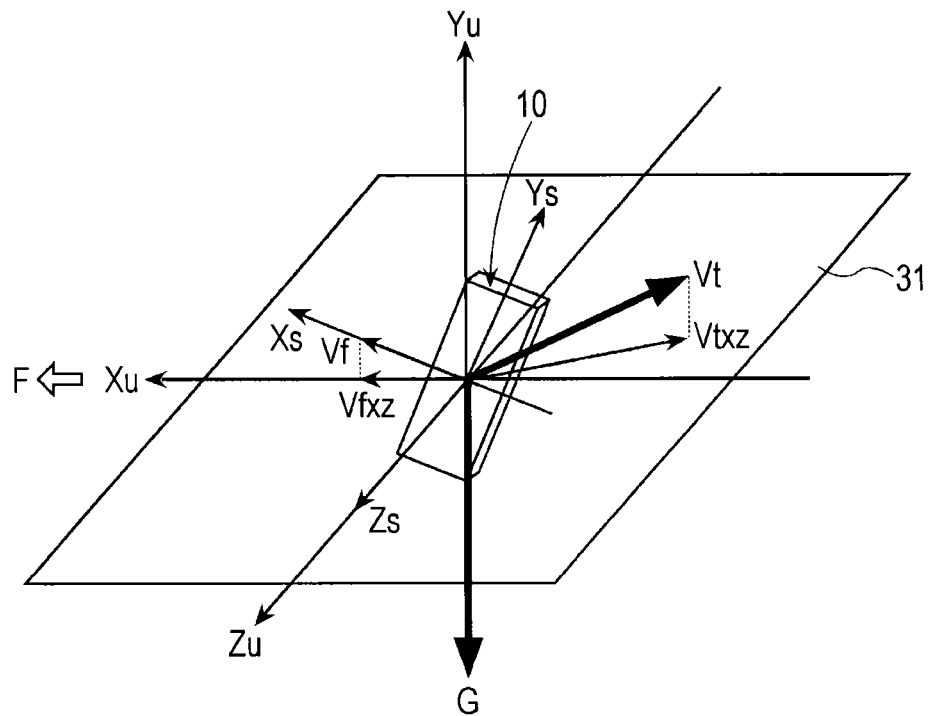
FIGS. 8A and 8B are other diagrams for describing various vector relations and various angles in a three-dimensional spatial coordinate system where the earphone is disposed.
Figure 8B:
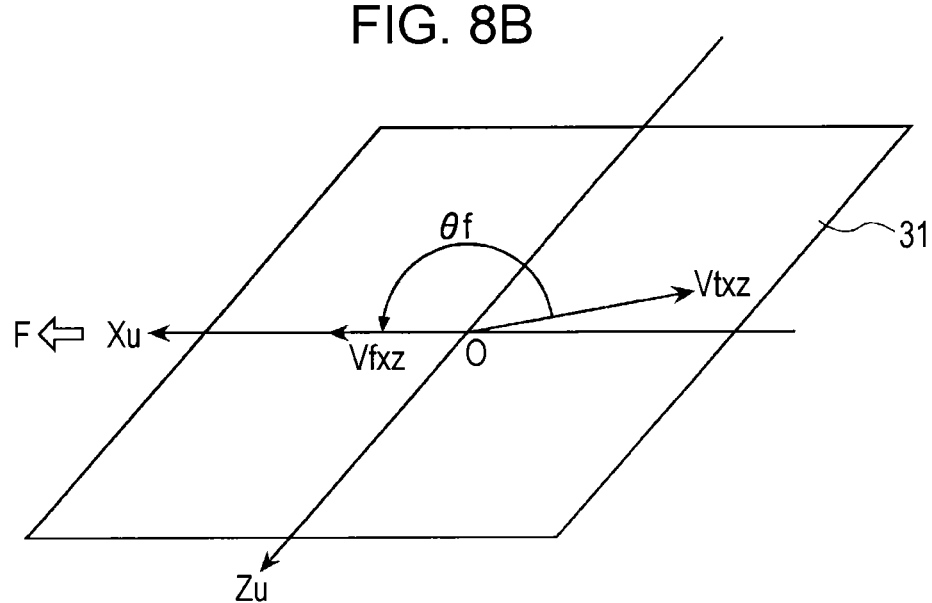

FIGS. 8A and 8B are another pair of diagrams for describing various vector relations and various angles in the three-dimensional space coordinate system where the earphone is disposed.

Instead of the obtaining method of the facial orientation F described in FIG. 7A, as illustrated in FIG. 8A, the forward vector Vf may be set along the Xs axial direction in an approximate manner. With this example, the forward vector Vf coincides with the positive direction of the X axis. The size of the vector Vf is optional (or in increments of vectors). A direction to specify a vector Vfxz to be obtained by projecting the forward vector Vf on the horizontal plane 31, i.e., on an Xu-Zu plane may be determined to be the user's facial orientation F. The facial orientation F obtained by the forward vector Vf does not necessarily coincide with the facial orientation F described in FIG. 7A, and may also include error as to the accurate facial orientation. However, the facial orientation F may be obtained in a rapid and convenient manner. As illustrated in FIG. 8B, in the same way as FIG. 7B, the bearing of the facial orientation F is determined by an angle θf the user's current facial orientation F as to the reference orientation vector Vtxz on the horizontal plane 31 which is equivalent to the XuZu plane.

In either case, upon the user moving the head, the earphone 10 worn on the head also moves together. In response to such movement of the head, the current vertical direction (gravity vector G) as to the earphone 10 is detected at individual time points. Also, the plane 33 (or forward vector Vf) in the user coordinate system is changed according to the movement of the head, and a new vector Vfxz (or facial orientation F) corresponding to this is determined.

With the application according to the present embodiment, from the geomagnetic orientation vector Vt, the reference orientation vector Vtxz is obtained by projecting this vector on the horizontal plane 31. The vector Vfxz (or facial orientation F) on the horizontal plane 31 is determined to be a vector of the direction of the angle θf with the reference orientation vector Vtxz as a reference.

The geomagnetic sensor 11 and acceleration sensor 12 are employed as a combination, whereby information of a direction (bearing) F where the user (user's face) faces, to be used for navigation can be obtained even in a state in which the user is stationary, i.e., without the user's movement.

Also, according to the current device technology, sensors with a relatively small size can be used as these sensors, and accordingly, these sensors can be mounted on the earphones without hindrance.

FIGS. 9A and 9B are diagrams for describing the working of the acceleration sensor 12 except that a gravity vector is detected.

As illustrated in FIG. 9A, the acceleration sensor 12 can detect motion acceleration accompanied with movement in addition to static acceleration such as the gravity or the like. For example, in the event that an object moves, positive acceleration is applied to the object thereof from a static state, and negative acceleration is applied thereto when the object stops. Therefore, as illustrated in FIG. 9B, the acceleration of the object is detected, and according to an integration value thereof, movement speed and movement distance can be obtained. However, in the event of uniform motion, acceleration is not changed, and accordingly, a moving state is failed to be detected unless acceleration is detected from a static state. Also, according to the architecture of the acceleration sensor 12, rotation is failed to be detected in the event of the earphone rotating with the gravity vector as an axis.

On the contrary, an example employing a gyroscope 13 together as a sensor will be described with reference to FIGS. 10A, 10B, and 10C.

Figure 10A:
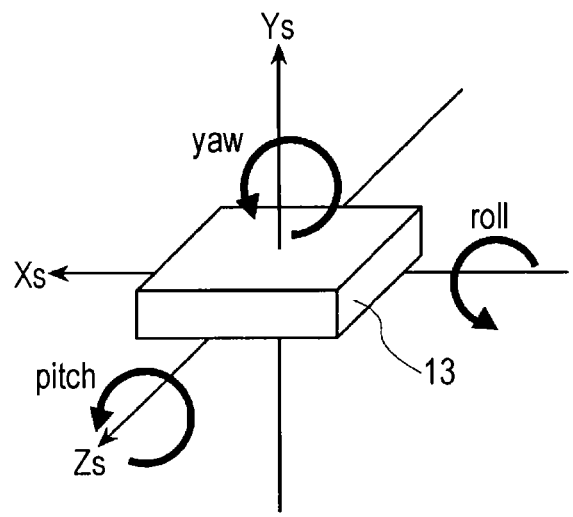
FIGS. 10A, 10B, and 10C are diagrams for describing an example of employing a gyroscope together as a sensor.
Figure 10B:
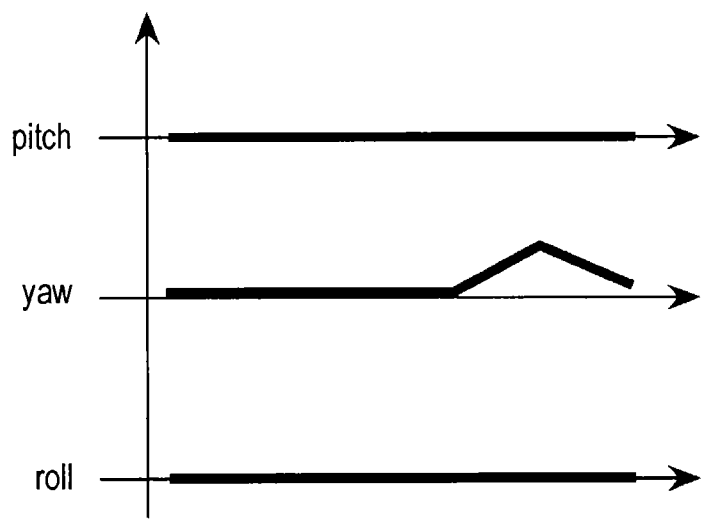
Figure 10C:
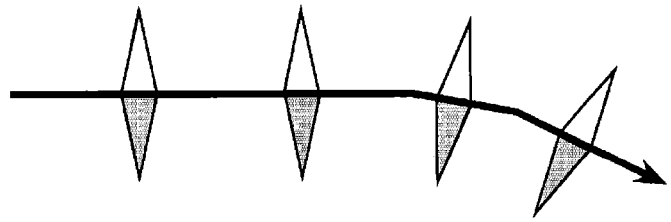

As illustrated in FIG. 10A, the gyroscope 13 is a sensor configured to detect angular velocity around each axis (roll, pitch, and yaw) of three axes of Xs, Zs, and Ys, and can detect rotation of an object. Also, the geomagnetic sensor 11 can detect a bearing where an object faces, based on a geomagnetic vector as described above. However, in the event that magnetic field lines do not face in a fixed orientation, such as the vicinity of a magnetized steel frame, when the earphone rotates while moving, an accurate bearing may be failed to be confirmed. Therefore, in the event of movement as illustrated in FIG. 10C, a rotation state can be detected only by the gyroscope. Here, the object is illustrated with a compass needle for convenience.

Accordingly, in addition to the above-mentioned geomagnetic sensor 11 and acceleration sensor 12, output of both sensors may be reinforced by employing the gyroscope 13 together as a sensor to be mounted on the earphone 10.

In this way, though the user's facial orientation F can be detected in real time with a certain level of accuracy only by the geomagnetic sensor and acceleration sensor, the earphone 10 can readily follow the user's relatively fast change in direction by employing the gyroscope (gyro sensor) together.

Figure 11:
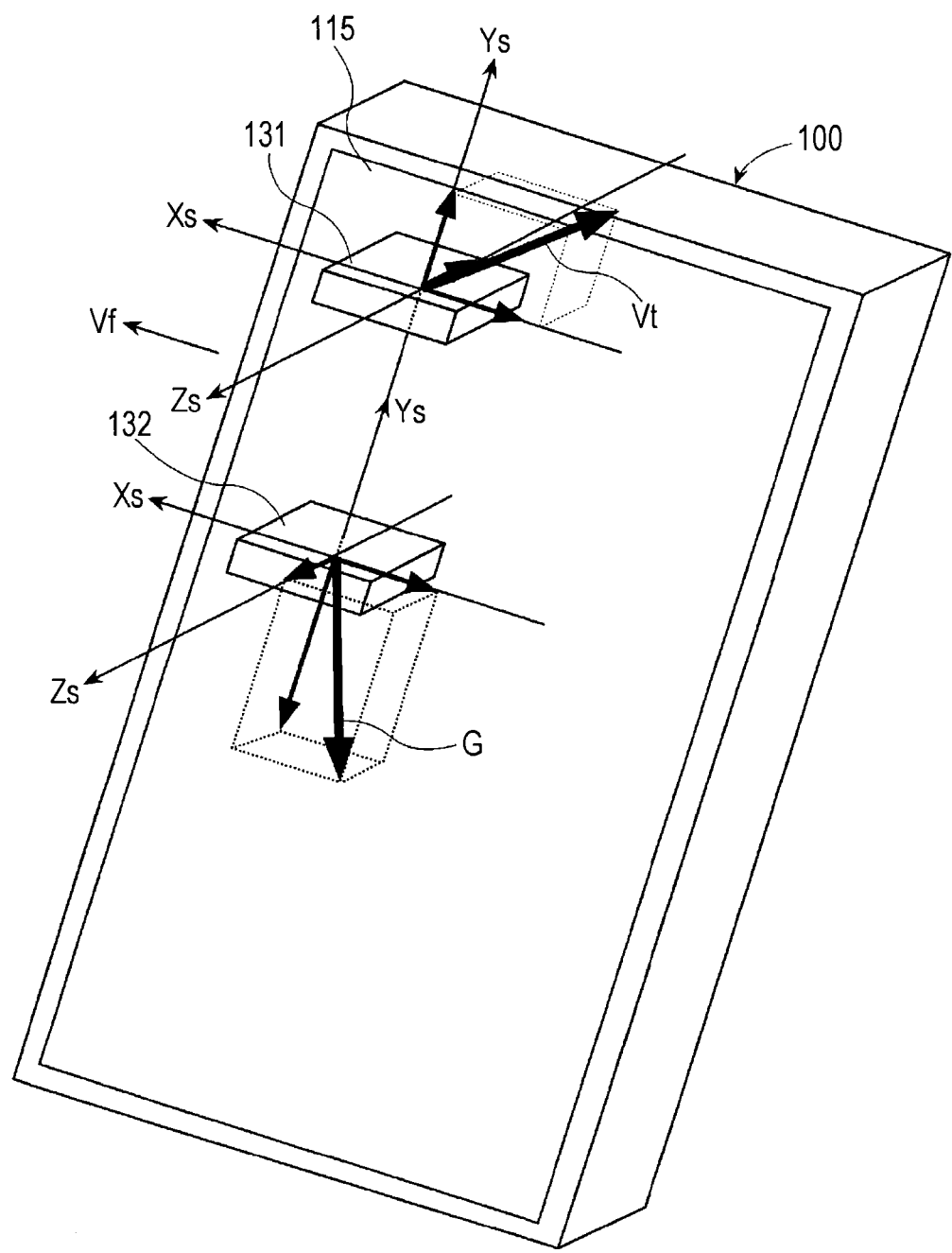
FIG. 11 is a diagram illustrating a display device employing a attitude detecting unit in an embodiment of the present disclosure.

As illustrated in FIG. 11, with the present embodiment, basically, such an attitude detecting unit is also provided to the display device 100, and detects the attitude thereof. The attitude detecting unit provided to the display device 100 is referred to as an internal attitude detecting unit, and is distinguished from the external posture detecting unit. As an exception, in the event that the display device 100 is a fixed type such as a television set, the attitude detection function does not have to be provided to the display device side. The internal attitude detecting unit according to the present embodiment includes a triaxial geomagnetic sensor and a triaxial acceleration sensor, a gravity direction is detected by the acceleration sensor, and a bearing where the display device faces on the horizontal plane is detected by the geomagnetic sensor. As described above, the internal attitude detecting unit may include a gyroscope.

FIG. 12 is a block diagram illustrating a configuration example of the display device 100a according to the present embodiment. With this example, a configuration of a personal digital assistant such as a so-called smart phone or tablet or the like is illustrated as a display device example.

The display device 100a includes a monaural-typed earphone 10a for cable connection. In general, a headphone including an earphone with a microphone is also referred to as a headset. Though no microphone is particularly illustrated in the above-mentioned block diagrams and external views of various earphones, a microphone may be housed therein. Though a microphone may be housed in the ear pads 17a1 and 17b1, casing 15, or the like, the microphone may be disposed protruding from these, or may be disposed in the middle of the cable 18.

The display device 100a includes a control line 150 and a data line 160, and is configured of various function units such as the following, to be connected to these lines.

A control unit 101 is configured of a processing unit made up of a CPU (Central Processing Unit) or the like, and performs execution of various control programs or application programs and various data processes accompanied therewith. With the data processes, communication control, audio processing control, image processing control, other various types of signal processing, control of the units, and so forth are performed, for example. With the present embodiment, the control unit 101 particularly controls a rotation angle of a display image based on posture information received from the external posture detecting unit and/or internal attitude detecting unit. More specifically, the control unit 101 controls the rotation angle of a display image in the display screen of the display device based on the user's posture indicated with the posture information received from the external posture detecting unit, and the attitude of the display device detected by the internal attitude detecting unit.

A communication circuit 102 is a circuit for wireless communication at the time of this display device 100 communicating with a wireless base station of a cellular phone network, for example. An antenna 103 is a wireless communication antenna at the time of this display device performing wireless communication with a wireless base station.

A display unit 104 is a unit to supervise a display interface of this display device, and has a display control function to rotatably display a display image on the display screen. The display unit 104 is configured of a display device, such as a liquid crystal display unit (LCD: Liquid Crystal Display), an organic EL display unit (OEL: Organic Electro Luminescence), or the like. The display unit 104 may further include a light-emitting unit such as an LED (light-emitting diode) or the like.

An operating unit 105 is a unit to supervise an input interface for user, and includes multiple operating keys and/or a touch panel.

Memory 106 is an internal storage device configured of RAM, flash memory, or the like, for example. The flash memory is nonvolatile memory, and is used for storing an OS (Operating System) program, a control program for the control unit 101 controlling each of the units, various application programs, in addition to music/moving image/still image data contents subjected to compression encoding, various setting values, font data, various types of dictionary data, model name information, terminal identification information, and so forth, for example. Also, there may be stored a phone book where the phone number, e-mail address, address, full name, face picture, portrait, and so forth of a user have been registered, transmitted/received e-mails, a schedule book where a schedule of the user of this display device have been registered, and so forth. The RAM stores data as a work area at the time of the control unit 101 performing various types of data processing or computation whenever occasion arises.

An external connection terminal 107 is a connector to which the cable 18 connected to an earphone 10a is connected.

An external device connection unit 170 is a unit to control reading/writing of an external storage device 171 detachable for the display device 100a. The external storage device 171 is an external memory card such as a so-called SD (Secure Digital) card or the like, for example. In this case, the external device connection unit 170 includes a slot which an external memory card is inserted/detached into/from, and performs control of writing/readout of data for the inserted external memory card, or the like, and signal processing.

A music data control unit 173 is a unit to perform readout and playback processing of music data stored in the external storage device 171 or memory 106. The music data control unit 173 may be configured to perform writing processing of music data. Played music data can be listened to by being converted into sound at the earphone 10a.

An imaging control unit 174 performs imaging control of a housed camera unit (digital camera) 175.

A speaker 110 is an electro-acoustic transducer for receiver audio output configured to transduce an electric signal into sound. A microphone unit 122 is a device for transmitter audio output configured to convert sound into an electric signal.

In the event that the earphone 10a is connected to the display device 100a, an external speaker 421 and an external microphone 422 within the earphone 10a are used instead of the speaker 110 and microphone 122 housed in the terminal. The external speaker 421 of the earphone 10a is connected to an earphone terminal 121 via the cable 18.

With the display device 100a as well, a geomagnetic sensor 131, and an acceleration sensor 132 (and gyroscope 133) are housed, as attitude detecting units.

The earphone 10a includes the external speaker 421, external microphone 422, an external geomagnetic sensor 411, an external acceleration sensor 412, and an external gyroscope 413, and an external connection control unit 401. The external geomagnetic sensor 411, external acceleration sensor 412, and external gyroscope 413 are included in the sensor device 16a. However, with the present embodiment, the external microphone 422 and external gyroscope 413 are not vital components.

The external connection control unit 401 is connected to the sensors using the control line and data line, and also connected to the external connection terminal 107 of the display device 100a via the cable 18. Preferably, in response to a request from the display device 100a, the external connection control unit 401 obtains output of each sensor in a periodical manner or as appropriate, and transmits this to the display device 100a as a sensor detection signal. More specifically, the external connection control unit 401 includes a connector conforming to the so-called USB 2.0 (Universal Serial Bus 2.0) standard as various types of external connectors, for example. Therefore, the display device 100a also includes a USB 2.0 controller.

Note that the display device 100a may include various types of components included in an existing display device not illustrated in FIG. 12.

FIG. 13 illustrates a configuration example of a display device 100b employing a wireless connection type earphone 10b. Basically, the display device 100b has the same configuration as the configuration of the display device 100a illustrated in FIG. 11, and similar components are denoted with the same reference numerals, redundant description will be omitted, and different points alone will be described.

A headphone 10b includes an external wireless communication unit 430 and an external communication antenna 431, and performs wireless communication with an antenna 109 of a wireless communication unit 108 of the display device 100b. This wireless communication is short-distance wireless communication, and wireless communication with relatively short-distance is performed using a short-distance wireless communication method, for example, such as Bluetooth (Bluetooth: registered trademark) or the like.

Hereafter, a specific control example of the display device according to the present embodiment will be described.

Figure 14A:
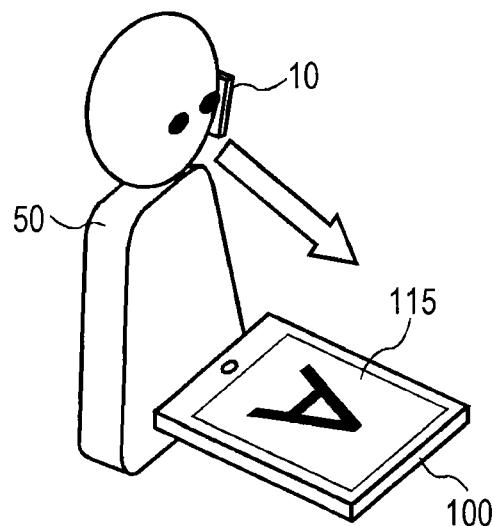
FIGS. 14A and 14B are diagrams illustrating a state in which a user whose upper body is in an erected state is facing a display device of which the screen is set horizontally upward in front of the user.
Figure 14B:
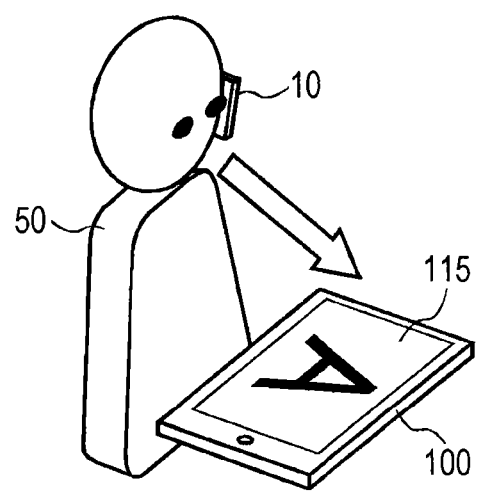

FIGS. 14A and 14B illustrate a state in which a user 50 whose upper body is in an erected state faces the display device 100 of which the screen is set generally horizontally upward in front of himself/herself. The drawing illustrates an example wherein a single operating button is disposed on the lower side of the display screen 115 of the display device 100. The operating button is, for convenience, illustrated to clarify the up-and-down direction of the display device 100 itself, and the operating button is not a vital component. Though the example is illustrated wherein the earphone 10 is worn on the left ear, the earphone may be worn on both ears. The erected state of the user's upper body may be either a state in which the user is standing or a state in which the user is sitting. With the present Specification, a state in which the upper body is erected is assumed to be a state in which the user's parietal region generally faces the vertically upward direction. The display device 100 has a generally rectangular display screen 115. However, the display screen does not have to be rectangular. The display device 100 serving as a personal digital assistant can change its orientation as to the user 50. As for the orientation of the display screen 115 having four sides as illustrated in the drawing, there are basically four angles of 0°, 90°, 180°, and 270° with the default state as a reference. In either case, display on the display device is controlled so that the orientation of contents (image) to be displayed on the display screen 115 agrees with the orientation of the user 50 in the state thereof. Here, agreement in orientation means that the image to be displayed on the display screen 115 is upright as viewed from the user 50. With the example in the drawing, a single letter "A" is illustrated as an image for convenience.

FIGS. 14A and 14B illustrate a case where the orientation of the display screen 115 as to the user 50 is 0°, and a case where the orientation of the display screen 115 as to the user 50 is 90°, respectively. In either case, display is controlled so that an image to be displayed on the display screen 115 thereof is upright as to the user 50 regardless of the orientation of the display device 100.

Figure 15A:
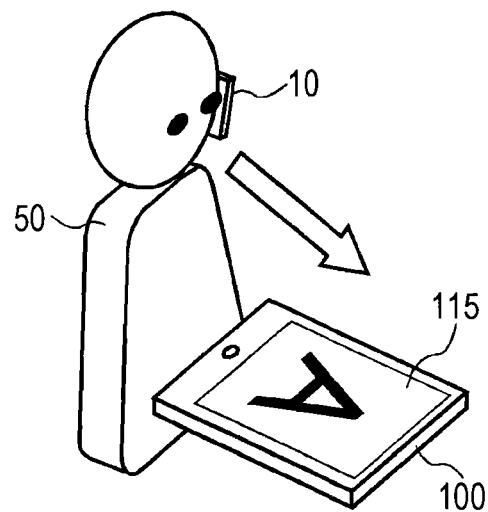
FIGS. 15A and 15B are diagrams illustrating states before and after a user changes his/her position as to the display device of which the display screen has been set horizontally upward by 90 degrees.
Figure 15B:
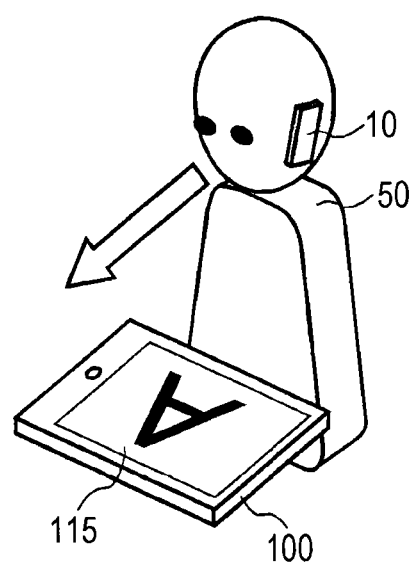

FIGS. 15A and 15B illustrate states before and after the user 50 changing his/her position by 90° as to the display device 100 of which the display screen 115 is set horizontally upward. With these cases as well, display is controlled so that an image to be displayed on the display screen 115 thereof is upright as to the user 50 regardless of the orientation of the display device 100.

Figure 16A:
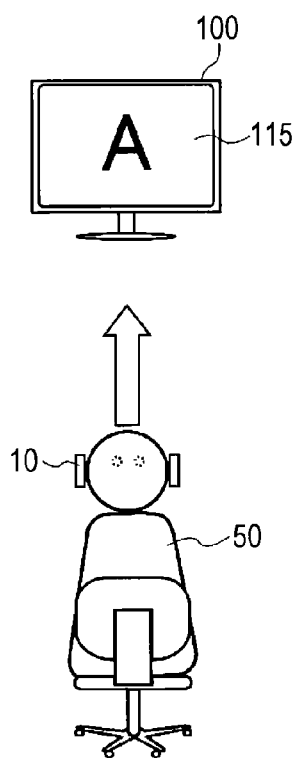
FIGS. 16A and 16B are diagrams illustrating an example of a television set as an example of a fixed-type display device.
Figure 16B:
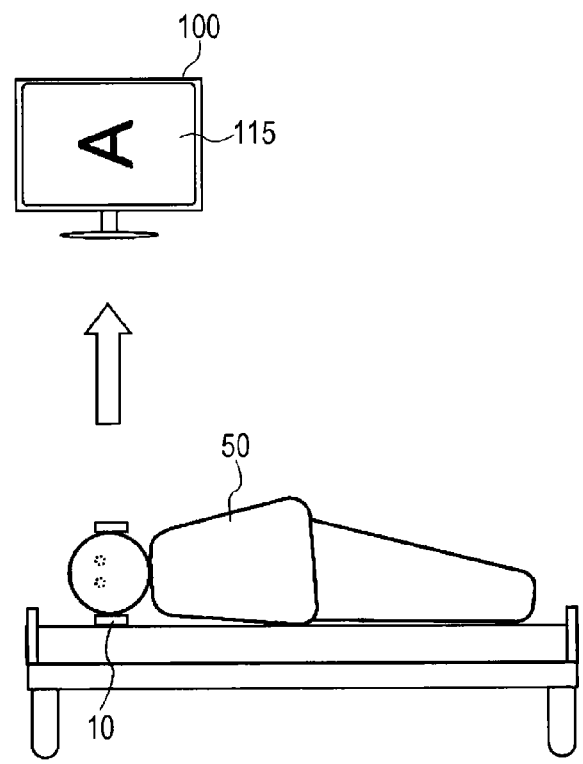
Figure 18A:
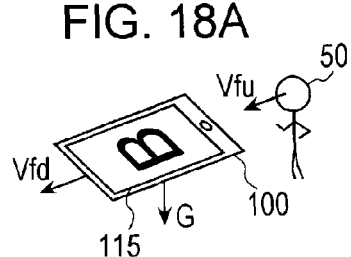
FIGS. 18A to 18L are diagrams illustrating various attitude and posture relations between a display device disposed with the display screen horizontally upward or horizontally downward and a user.
Figure 18E:
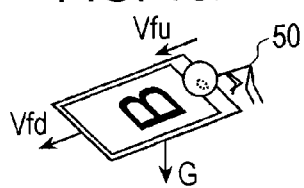
Figure 18I:
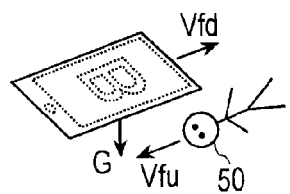
Figure 18B:
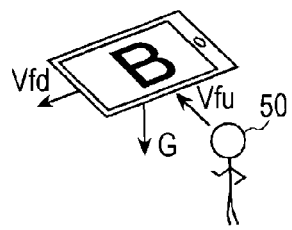
Figure 18F:
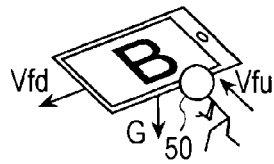
Figure 18J:
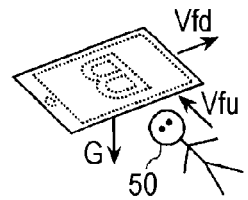
Figure 18C:
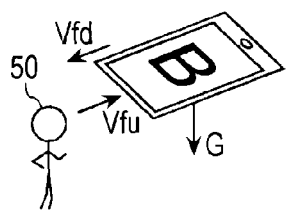
Figure 18G:
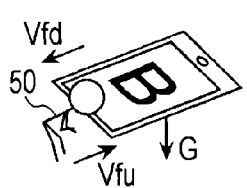
Figure 18K:
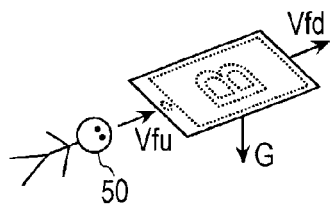
Figure 18D:
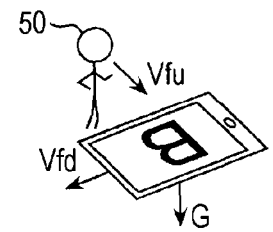
Figure 18H:
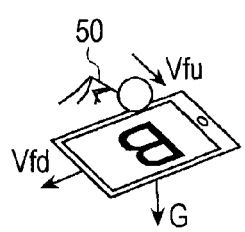
Figure 18L:
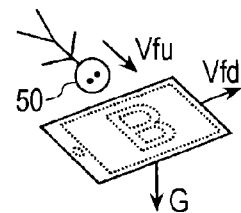

FIGS. 16A and 16B illustrate a television set example as an example of the fixed-type display device 100. With these cases, the display screen 115 is constantly erected in the vertical direction, and the orientation of an image on the display screen 115 is controlled according to the user 50's posture. As illustrated in FIG. 16A, in the event that the user 50's upper body is erected, the screen of the display device 100 becomes a default state, i.e., 0° rotation. In a state in which the user 50 is lying leftward such as FIG. 16B, the screen of the display device 100 becomes left 90° rotation with the default state as a reference. Thus, the fixed-type display device does not have to have its own attitude detection function.

FIGS. 17A to 17L illustrate various relations of attitudes and postures between the display device 100 and the user 50 in a state in which the user 50 has his/her upper body erected or is in a lying state, and faces the display device 100 disposed with the display screen 115 being erected in the vertical direction.

FIGS. 17A to 17C illustrate a state in which the user 50 with the upper body being erected faces the display device 100 in an upright state with the longitudinal direction coinciding with the vertical direction (i.e., vertically long), lying rightward, and lying leftward. With the present Specification, a state in which the user is lying is assumed that the parietal region faces a direction generally orthogonal to the vertical direction. Whether the user stands erect, or is lying in either orientation of the left and right can be determined based on output of the acceleration sensor housed in the earphone worn on the user. According to the user's these three postures, an image on the display screen 115 is set to either of 0° rotation, left 90° rotation, or right 90° rotation with the default state as a reference. FIGS. 17A and 17C are equivalent to the above-mentioned cases of FIGS. 16A and 16B, respectively.

FIGS. 17D to 17F illustrate a state in which the user 50 faces the display device 100 in a state in which the top is erected rightward in a horizontally long manner, with the upper body being erected, lying rightward, and lying leftward. According to the user's these three postures, an image on the display screen 115 is set to either of left 90° rotation, 0° rotation, or 180° rotation.

FIGS. 17G to 17I illustrate a state in which the user 50 faces the display device 100 in a state inverted with the longitudinal direction coinciding with the vertical direction (i.e., vertically long), with the upper body being erected, lying rightward, and lying leftward. Whether the user stands erect, or is lying in either orientation of the left and right, can be determined based on output of the acceleration sensor housed in the earphone worn on the user. According to the user's these three postures, an image on the display screen 115 is set to either of 180° rotation, left 90° rotation, or right 90° rotation with the default state as a reference.

FIGS. 17J to 17L illustrate a state in which the user 50 faces the display device 100 in a state in which the top is erected leftward in a horizontally long manner, with the upper body being erected, lying rightward, and lying leftward. According to the user's these three postures, an image on the display screen 115 is set to either right 90° rotation, 180° rotation, or 0° rotation, respectively.

In this way, even if the display device 100 is in either of a vertically long state or horizontally long state, as long as the display device 100 is in an erected (upright or inverted) state, with either the display device 100 or the earphone 10, control of the display device can be performed according to only the output of the acceleration sensor without reference to the output of the geomagnetic sensor.

FIGS. 18A to 18L illustrate various relations of attitudes and postures between the display device 100 and the user 50 in a state in which the display screen 115 is disposed horizontally upward or horizontally downward. Of these, FIGS. 18A to 18D illustrate a state in which the user faces the display device 100 of which the display screen 115 is disposed horizontally upward, with the upper body being generally erected at one side of the four sides thereof. That the upper body of the user is generally erected can be determined based on output of the triaxial acceleration sensor housed in the earphone worn on the user. The image in FIGS. 18A to 18L illustrate a single letter "B" for convenience.

A vector Vfd illustrated in the drawing indicates a direction on the horizontal plane where the display device at this time faces. Also, a vector Vfu indicates a direction on the horizontal plane where the user's face (or parietal region) faces (equivalent to the vector Vfxz). Bearings where these vectors Vfd and Vfu face can be determined based on output of the geomagnetic sensors mounted on the display device and earphone.

The orientation of an image to be displayed on the display screen in FIGS. 18A to 18D is an upright orientation with the direction of the vector Vfu of the user being the upper side as to the user. We will say that "posture/attitude" in the present Specification represents the posture/attitude of the user or display device in the general meaning, but in the narrow meaning, also includes a bearing where the user's face or parietal region, and the upper end of the display device face, are facing. Specifically, according to bearings where the these four of the user face, an image on the display screen 115 is set to either of 0° rotation, right 90° rotation, 180° rotation, or left 90° rotation, respectively, with the default state as a reference.

FIGS. 18E to 18H illustrate a state with the user 50 looking into the display screen 115 of the display device 100 of which the display screen is disposed horizontally upward, from above on one side of four sides thereof. Difference from FIGS. 18A to 18D is the user's posture as to the display device. That the user is facing vertically downward can be determined based on output of the acceleration sensor housed in the earphone worn by the user. The vector Vfu in this case is a direction where the user's parietal region faces on the horizontal plane. A direction (bearing) where the parietal region faces can be obtained based on an angle that a vector Ysxz to be obtained by projecting a vector Ys on the horizontal plane makes up along with a reference orientation vector Vtxz. In this case as well, the orientation of an image to be displayed on the display screen is an orientation upright as to the user with the direction of the vector Vfu of the user as the upper side. Specifically, according to bearings where the user's these four face, an image on the display screen 115 is set to either of 0° rotation, right 90° rotation, 180° rotation, or left 90° rotation, respectively, with the default state as a reference.

FIGS. 18I to 18L illustrate a state with the user looking into the display screen 115 of the display device 100 of which the display screen 115 is disposed horizontally downward, from the lower side of the display device 100 on one side of four sides thereof. With these cases as well, that the user faces vertically upward can be determined based on output of the triaxial acceleration sensor housed in the earphone worn by the user. Similarly, the orientation of an image to be displayed on the display screen is an orientation upright as to the user with the direction of the vector Vfu of the user as the upper side. Specifically, according to bearings where the user's these four face, an image on the display screen 115 is set to either of 180° rotation, right 90° rotation, 0° rotation, or left 90° rotation, respectively, with the default state as a reference.

In this way, even if the display screen 115 is upward or downward, as long as the display screen 115 is in a state disposed on the horizontal plane, with either the display device 100 or the earphone 10, control of the display device 100 can be performed according to both of the output of the geomagnetic sensor, and the output of the acceleration sensor.

Figure 19:
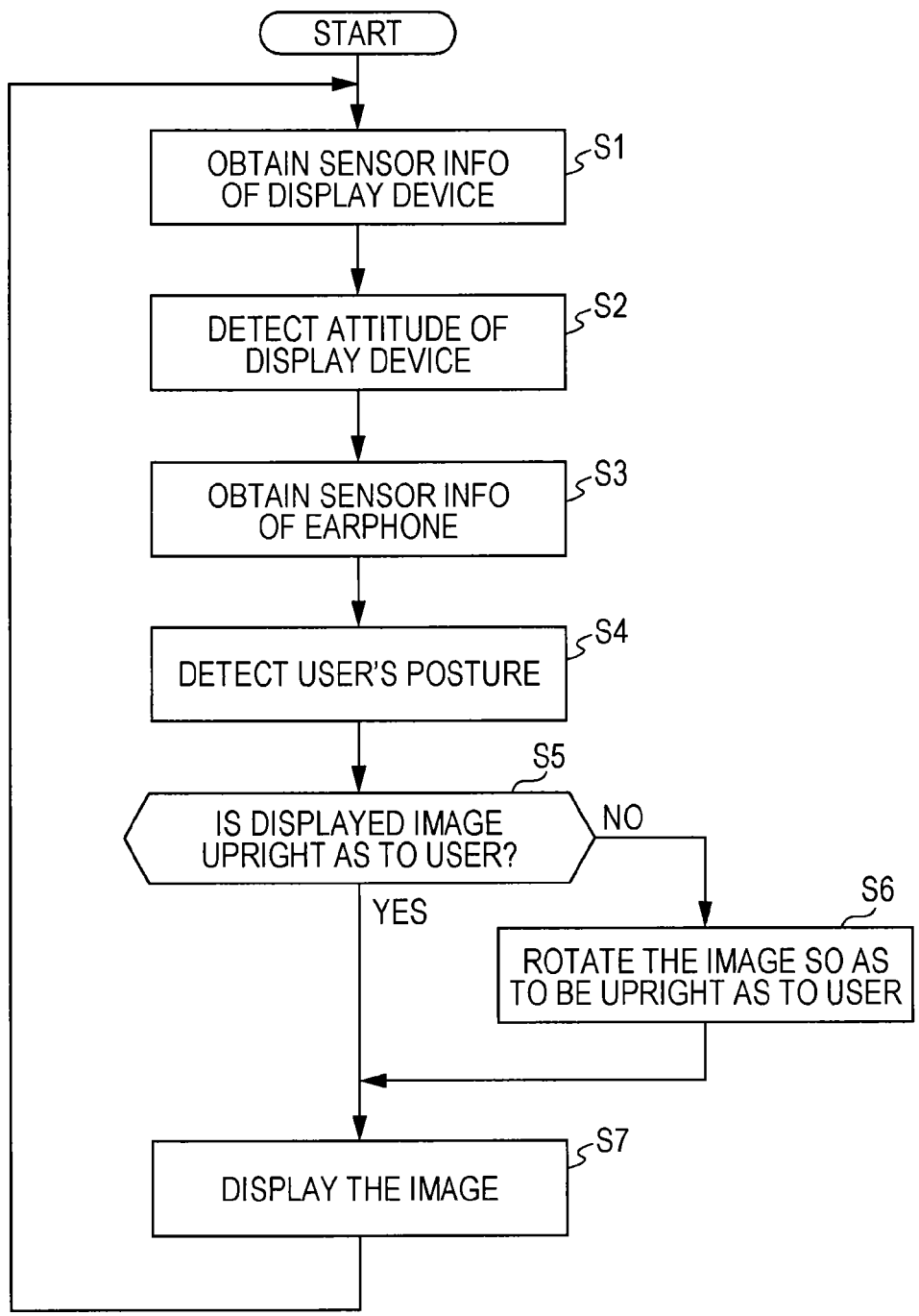
FIG. 19 is a flowchart representing a procedure of processing in an embodiment of the present disclosure.
Figure 20:
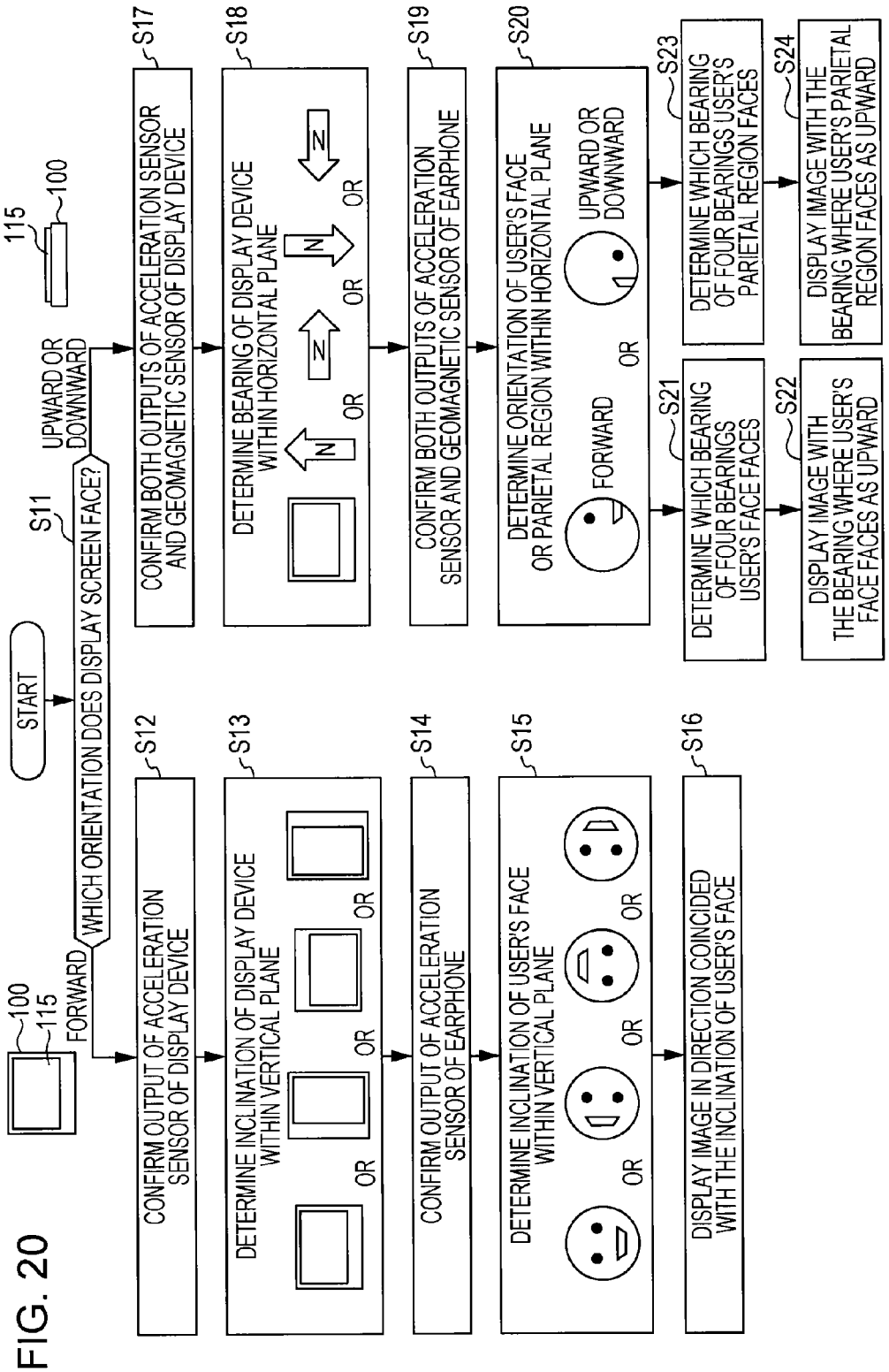
FIG. 20 is a diagram for more specifically describing by classifying a display control mode to be executed according to both attitudes of the display device and a earphone worn by a user, according to an embodiment of the present disclosure, into cases.

FIG. 19 illustrates a flowchart representing a procedure of processing according to the present embodiment. This processing is realized by the control unit 101 of the display device 100 executing a computer program read out from the memory 106 or the like. First, sensor information to be used is obtained from the attitude detecting unit provided to the display device (S1). The sensor information of the display device includes an output value of a sensor such as the above-mentioned geomagnetic sensor 131, and acceleration sensor 132 (and gyroscope 133).

Next, the attitude of the display device is detected based on this sensor information (S2). This attitude of the display device is such that the display screen of the display device is either in an erected state or horizontal state, and in the event of a horizontal state, a direction (bearing) where the display device faces includes either information.

Further, sensor information of the earphone serving the external posture detecting unit is obtained (S3). This sensor information of the earphone includes an output value of a sensor such as the above-mentioned external geomagnetic sensor 411, and external acceleration sensor 412 (and external gyroscope 413).

Next, the user's posture is detected based on this sensor information (S4). This user's posture includes information of inclination of the user's face within a vertical plane (rotation angle), or the orientation of the user's face or parietal region within a horizontal plane (facing bearing).

Therefore, based on the attitude of the display device and the user's posture, confirmation is made whether or not an image to be displayed on the display screen of the display device is in an upright state for the user (S5). In the event that the image is in an upright state, this image is displayed without change (S7), or other wise, the image is rotated so that the image to be displayed on the display screen becomes an upright state for the user (S6), and displayed (S7).

Thereafter, the processing returns to step S1, and the above-mentioned processing steps are repeatedly executed.

Next, description will be made more specifically by classifying a display control mode to be executed according to both attitudes of the display device 100 and the earphone worn by the user, according to the present embodiment, into cases.

First, as the attitude of the display device 100, confirmation is made based on output of the acceleration sensor thereof whether the orientation of the display screen is forward, upward, or downward (S11). In other words, confirmation is made whether the display screen is in an erected state or in a horizontal state. As described above, in the event of the fixed-type display device, this confirmation step may be omitted.

In the case that the display screen is "forward", this is equivalent to FIGS. 17A to 17L, and only the output of the acceleration sensor of the display device is confirmed (S12). Based on this output of the acceleration sensor, the orientation (inclination or rotation angle) of the display device (display screen) within the vertical plane is determined (S13).

Following step S13, the output of the acceleration sensor of the earphone is confirmed (S14). Based on this output of the acceleration sensor, the orientation (inclination or rotation angle) of the user's face within the vertical plane is determined (S15). Note that the orientation (inclination or rotation angle) of the user's inverted face illustrated regarding this step is not realistic, and accordingly, this may be omitted.

The image of the display device is displayed so as to have an orientation agreeing with the confirmed orientation of the user's face, i.e., so that the image is upright for the user (S16).

In step S11, in the event that the display screen is "upward or downward", this is equivalent to FIGS. 18A to 18L, and outputs of both of the acceleration sensor and geomagnetic sensor of the display device are confirmed (S17).

Based on these sensor outputs, a direction (bearing) where the display device faces within the horizontal plane is determined (S18).

Next, both outputs of the acceleration sensor and geomagnetic sensor of the earphone are confirmed (S19). Based on both confirmed outputs, the orientation of the user's face or parietal region within the horizontal plane is determined (S20). At this time, determination is made whether the user's face is forward, upward, or downward. This determination is performed based on output of the acceleration sensor of the earphone. In the case of "forward", determination is made regarding the orientation (bearing) of the user's face within the horizontal plane, i.e., which of the four cardinal directions the user's face faces (S21). Next, the image is displayed on the display screen with the bearing where the user's face faces as upward (S22).

Next, in the event that the determination result in step S20 is "upward or downward", determination is made regarding the orientation (bearing) of the user's parietal region within the horizontal plane, i.e., which of the four cardinal directions the user's parietal region faces (S23). Next, the image is displayed on the display screen with the bearing where the user's parietal region faces as upward (S24).

Figure 21A:
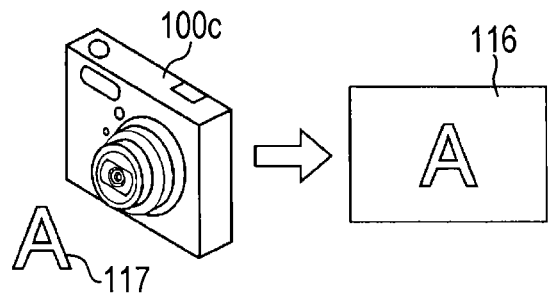
FIGS. 21A to 21C are explanatory diagrams in the case of applying the present embodiment to a camera.
Figure 21B:
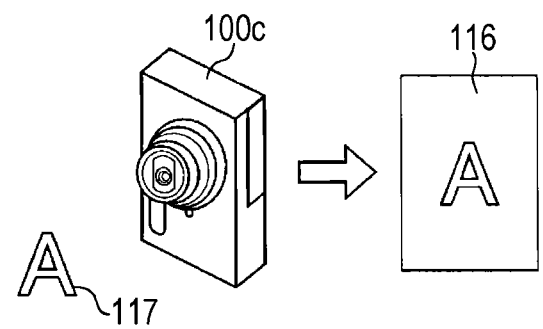
Figure 21C:
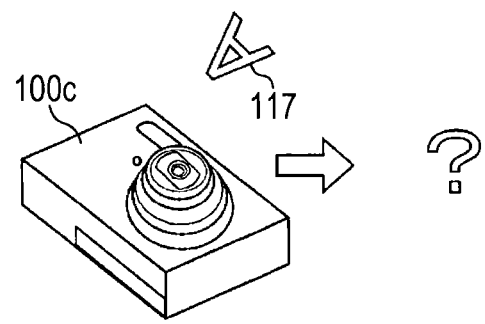

FIGS. 21A to 21C are explanatory diagrams in the event of applying the present embodiment to a camera. Basically, a digital camera having a display screen is equivalent to the display device, and accordingly, the same processing as described above can be applied. As for a camera, personal digital assistants such as so-called smart phones and tablets having a digital camera function are included.

Digital cameras which are currently commercially available are configured to confirm the orientation of the camera at the time of photo shooting using an acceleration sensor, and to create photo data of a captured image 116 where the up and down and orientation of the camera are aligned. As illustrated in FIGS. 21A and 21B, the upward direction of the captured image 116 to be shot by a camera 100c is determined with the gravity direction. Therefore, in the event that shooting is performed by directing the lens of the camera "directly above" or "directly below" in the vertical direction in a state in which the camera is in a horizontal state as illustrated in FIG. 21C, this includes a problem in that the orientation of a photo to be shot (captured image) is not determined (randomly determined). For example, in the event of taking a photo directly below, the orientation of a finished photo may become an unintended direction. This is a case where use of the acceleration sensor output becomes adverse effects. The captured image 116 is also an image to be displayed on a monitor screen (display screen) 115 positioned on the rear face of the camera 100c.

As for an external posture detecting unit, in the event that a headphone or earphones are attached to the camera 100c, this can be made to concurrently serve as an external posture detecting unit. With this configuration, the camera 100c is equivalent to the display device.

However, in the event that the camera stands upright in the vertical direction, based on only the attitude of the camera 100c, i.e., only the orientation (rotation angle) of the camera within the vertical plane instead of the user's posture, the rotation angle of a captured image (display image) is determined and saved.

Description will be made more specifically by classifying a display control mode to be executed according to both attitudes of the camera 100c and the earphone 10 worn by the user, according to the present embodiment, into cases, with reference to FIG. 22.

First, as the attitude of the camera 100c, confirmation is made based on output of the acceleration sensor thereof whether the orientation of the display screen (lens) is forward, upward, or downward (S31). In other words, confirmation is made whether the display screen is in an erected state or in a horizontal state.

In the case that the display screen is "forward", only the output of the acceleration sensor of the camera is confirmed (S32). Based on this output of the acceleration sensor, the orientation (inclination or rotation angle) of the camera (display screen) within the vertical plane is determined (S33).

Next, the rotation angle of the display image is maintained in accordance with the determined orientation of the camera and saved, and also, with regard to the captured image, the captured image is rotated in accordance with the inclination of the camera and saved (S34). Specifically, the captured image is rotated so that the top (side where the shutter button exists in the drawing) of the current camera becomes upward and saved. Thus, when displaying the captured image on the television receiver or the display screen of a personal computer (PC), the top and bottom of the subject at the time of shooting is correctly displayed.

In step S31, in the event that the display screen is "upward or downward", both outputs of the acceleration sensor and geomagnetic sensor of the camera are confirmed (S35).

Based on these sensor outputs, the direction (bearing) where the camera within the horizontal plane faces is determined (S36).

Next, both outputs of the acceleration sensor and geomagnetic sensor of the earphone are confirmed (S37). Based on both confirmed outputs, the orientation of the user's face or parietal region within the horizontal plane is determined (S38). At this time, determination is made whether the user's face is forward, upward, or downward. This determination is performed based on output of the acceleration sensor of the earphone. In the case of "forward", determination is made regarding the orientation (bearing) of the user's face within the horizontal plane (i.e., which of the four cardinal directions the user's face faces) (S39). Next, the display image is rotated so that a direction (bearing) where the user's face faces becomes upward (S40). For example, in the event that the user's face faces east, and the bearing on the upper side of the captured image is north (the camera top head within the horizontal plane faces north), the camera receives information of user's facial orientation, and rotates the display image so that the upper side of the display image faces east. Also, the captured image is rotated so that the bearing where user's face faces becomes upward and saved.

Next, in the event that the determination result in step S38 is "upward or downward", determination is made regarding the orientation (bearing) of the user's parietal region within the horizontal plane (S38). Next, the bearing of the user's parietal region (i.e., which of the four cardinal directions user's parietal region faces) is determined (S41). Here, the display image is rotated so that a direction (bearing) where the user's parietal region faces becomes upward (S42). For example, in the event that the user's parietal region faces north, and the bearing on the upper side of the captured image is west (the camera top head within the horizontal plane faces west), the camera receives information of the orientation of user's parietal region, and rotates the display image so that the upper side of the display image faces north. Also, the captured image is rotated so that the bearing where user's parietal region faces becomes upward and saved.

A bearing to be detected can be obtained, based on an angle that the reference orientation and the forward direction of the display device or user make up, as a bearing to which this forward direction is the closest. Specifically, for example, this angle can be determined to be that near 0° is north, near 90° is west, near 180° is south, and near −90° is east.

Figure 23:
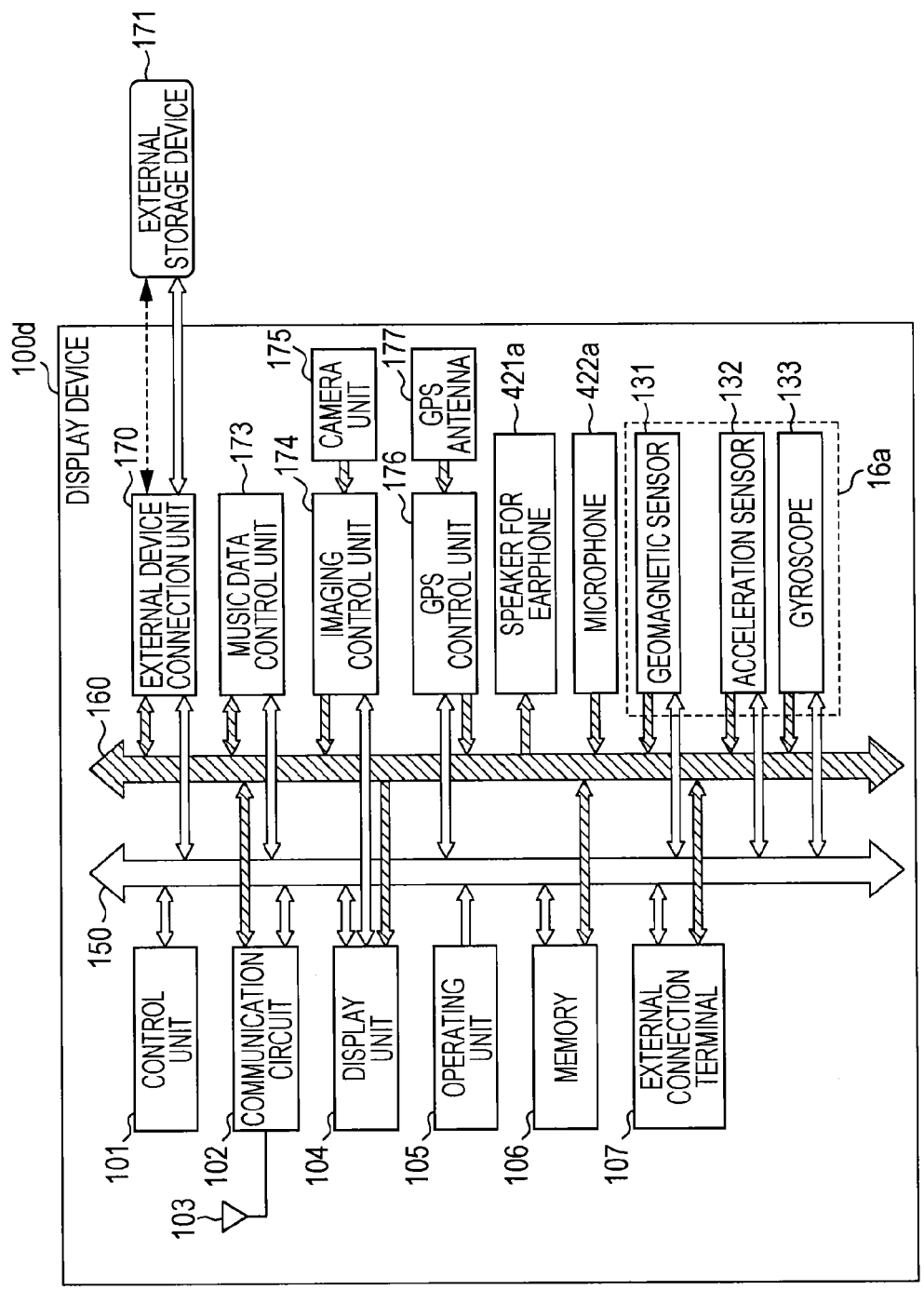
FIG. 23 is a block diagram illustrating a configuration example of a display device integral with a headphone (earphones).

Also, with the above description, a case has been assumed where the display device and headphone are separated. However, a configuration can also be conceived wherein the function of the display device is housed in the headphone. FIG. 23 illustrates a configuration example of such a display device 100d integral with a headphone (earphones). This device can be regarded as a headphone in which the display device function is housed.

A speaker 421a and microphone 422a for earphones are attached to the case of the display device 100d.

Also, the configuration of the display device integral with a headphone in FIG. 23 may have only one of the left and right earphones. In this case, the left and right earphones are mutually connected by cable connection or by wireless connection.

Note that all of the components illustrated as the display device 100d are not vital. Also, other components included in an existing display device not illustrated in the drawing may be included.

As described above, an embodiment of the present disclosure includes the following various modes.

(1) An information processing apparatus comprising:
a communication interface configured to be connected to an external posture detecting device to be worn by a user;
a display configured to display a display image; and
circuitry configured to control a rotation angle of the display image based on posture information received from the external posture detecting device.

(2) The information processing apparatus of (1), further comprising:
an attitude detecting device configured to detect an attitude of the information processing apparatus.

(3) The information processing apparatus of (2), wherein the circuitry is configured to control the rotation angle of the image displayed by the display based on the posture information received from the external posture detecting device and an attitude of the information processing apparatus detected by the attitude detecting device.

(4) The information processing apparatus of any and of (1) to (2), wherein
the external posture detecting device includes a triaxial geomagnetic sensor and a triaxial acceleration sensor.

(5) The information processing apparatus of (4), wherein
the external posture detecting device is configured to detect a gravity direction using the acceleration sensor, and detect a bearing of the external posture detecting device in relation to a horizontal plane using the geomagnetic sensor (6) The information processing apparatus of any of (1) to (5), wherein
the circuitry is configured to control the rotation angle of the image displayed by the display so that the image displayed by the display becomes an upright state for the user.

(7) The information processing apparatus of (1) to (6), wherein
the image processing apparatus is a digital camera and the image displayed on the display corresponds to an image captured by the digital camera.

(8) The information processing apparatus of (1) to (7), wherein the external posture detecting device is included in a headphone unit configured to be worn on the user's head.

(8) A method performed by an information processing apparatus, the method comprising:
receiving posture information from an external posture detecting device worn by a user;
displaying a display image on a display of the information processing apparatus; and
controlling, by circuitry, a rotation angle of the display image based on the posture information received from the external posture detecting device.

(9) A computer-readable medium including computer program instructions, which when executed by an information processing device, cause the information processing device to:
receive posture information from an external posture detecting device worn by a user;
display a display image on a display of the information processing apparatus; and
control a rotation angle of the display image based on the posture information received from the external posture detecting device.

Though preferred embodiments of the present disclosure have been described so far, various modifications and changes may be performed other than mentioned above. Specifically, it is understood as a matter of course that as long as within a range of Claims or equivalent to Claims, various modifications and combinations and other embodiments can be conceived according to design or other factors by one skilled in the art.

For example, in the event of a stereo type headphone, left and right earphones may serve as posture detecting units, respectively. In this case, control of the left and right earphones may be performed so as to execute processing common to the left and right at only one of the earphones. Alternatively, an arrangement may be made wherein only one of the left and right earphones serves as a posture detecting unit.

Though an example has been illustrated wherein the external posture detecting unit configured to detect a user's posture is provided to a earphone (headphone), as long as a device which a user wears on the head, the device is not restricted to the earphone (headphone).

A computer program to realize the functions described in the above-mentioned embodiments using a computer, and a recording medium in which the program is stored in a computer-readable manner are also included in the present disclosure. Examples of "recording medium" to supply the program include magnetic recording media (flexible disk, hard disk, magnetic tape, etc.), optical discs (magneto-optical disks such as MO, PD and so forth, CD, DVD, etc.), and semiconductor storage.

The invention claimed is:
1. An information processing apparatus comprising:
a communication interface configured to be connected to an external posture detecting device to be worn by a user, the external posture detecting device including a first attitude detecting device configured to detect, using a triaxial acceleration sensor, an attitude of the external posture detecting device, the attitude of the external posture detecting device including inclination information of the external posture detecting device within a vertical plane with respect to a horizontal plane relative to gravity, the vertical plane being parallel to a direction of the gravity and vertical to the horizontal plane;

a second attitude detecting device configured to detect an attitude of the information processing apparatus, the attitude of the information processing apparatus including inclination information of the information processing apparatus within the vertical plane with respect to the horizontal plane;

a display configured to display a display image; and circuitry configured to:

determine whether the information processing apparatus is facing either (1) upward or downward directions with respect to the horizontal plane, or (2) directions other than upward or downward directions with respect to the horizontal plane;

in case the information processing apparatus is determined to be facing (1) upward or downward directions with respect to the horizontal plane, control the rotation angle of the display image with respect to the display based on a bearing of the external posture detecting device and a bearing of the information processing apparatus so that the display image displayed by the display becomes an upright state for the user even when the information processing apparatus is facing upward or downward directions with respect to the horizontal plane; and in case the information processing apparatus is determined to be facing (2) the directions other than upward or downward directions with respect to the horizontal plane, control a rotation angle of the display image with respect to the display based on the attitude of the external posture detecting device received from the external posture detecting device and the attitude of the information processing apparatus detected by the second attitude detecting device so that the display image displayed by the display becomes an upright state for the user even when the user is inclined within the vertical plane with respect to the horizontal plane such that a line connecting a right eye and a left eye of the user is rotated within the vertical plane from a state where the user is upright such that the line is parallel to the horizontal plane.

2. The information processing apparatus of claim 1, wherein
the information processing apparatus is a digital camera and the image displayed on the display corresponds to an image captured by the digital camera.

3. The information processing apparatus of claim 1, wherein
the external posture detecting device is included in a headphone unit configured to be worn on the user's head.

4. The information processing apparatus of claim 1, wherein the external posture detecting device includes a first triaxial geomagnetic sensor configured to detect the bearing of the external posture detecting device in the horizontal plane.

5. The information processing apparatus of claim 4, wherein the information processing apparatus further comprises a second triaxial geomagnetic sensor configured to detect the bearing of the information processing apparatus in the horizontal plane.

6. A method performed by an information processing apparatus, the method comprising:

receiving posture information from an external posture detecting device worn by a user, the external posture detecting device including a first attitude detecting device configured to detect, using a triaxial acceleration sensor, an attitude of the external posture detecting device, the attitude of the external posture detecting device including inclination information of the external posture detecting device within a vertical plane with respect to a horizontal plane relative to gravity, the vertical plane being parallel to a direction of the gravity and vertical to the horizontal plane;

detecting an attitude of the information processing apparatus, the attitude of the information processing apparatus including inclination information of the information processing apparatus within the vertical plane with respect to the horizontal plane;

displaying a display image on a display of the information processing apparatus;

determining, by circuitry, whether the information processing apparatus is facing either (1) upward or downward directions with respect to the horizontal plane, or (2) directions other than upward or downward directions with respect to the horizontal plane;

in case the information processing apparatus is determined to be facing (1) upward or downward directions with respect to the horizontal plane, controlling, by the circuitry, the rotation angle of the display image with respect to the display based on a bearing of the external posture detecting device and a bearing of the information processing apparatus so that the display image displayed by the display becomes an upright state for the user even when the information processing apparatus is facing upward or downward directions with respect to the horizontal plane; and in case the information processing apparatus is determined to be facing (2) the directions other than upward or downward directions with respect to the horizontal plane, controlling, by the circuitry, a rotation angle of the display image with respect to the display based on the attitude of the external posture detecting device received from the external posture detecting device and the attitude of the information processing apparatus so that the display image displayed by the display becomes an upright state for the user even when the user is inclined within the vertical plane with respect to the horizontal plane such that a line connecting a right eye and a left eye of the user is rotated within the vertical plane from a state where the user is upright such that the line is parallel to the horizontal plane.

7. A non-transitory computer-readable medium including computer program instructions, which when executed by an information processing device, cause the information processing device to:

receive posture information from an external posture detecting device worn by a user, the external posture detecting device including a first attitude detecting device configured to detect, using a triaxial acceleration sensor, an attitude of the external posture detecting device, the attitude of the external posture detecting device including inclination information of the external posture detecting device within a vertical plane with respect to a horizontal plane relative to gravity, the vertical plane being parallel to a direction of the gravity and vertical to the horizontal plane;

detecting an attitude of the information processing apparatus, the attitude of the information processing apparatus including inclination information of the information processing apparatus within the vertical plane with respect to the horizontal plane;

display a display image on a display of the information processing apparatus;

determine whether the information processing apparatus is facing either (1) upward or downward directions with respect to the horizontal plane, or (2) directions other than upward or downward directions with respect to the horizontal plane;

in case the information processing apparatus is determined to be facing (1) upward or downward directions with respect to the horizontal plane, control the rotation angle of the display image with respect to the display based on a bearing of the external posture detecting device and a bearing of the information processing apparatus so that the display image displayed by the display becomes an upright state for the user even when the information processing apparatus is facing upward or downward directions with respect to the horizontal plane; and in case the information processing apparatus is determined to be facing (2) the directions other than upward or downward directions with respect to the horizontal plane, control a rotation angle of the display image with respect to the display based on the attitude of the external posture detecting device received from the external posture detecting device and the attitude of the information processing apparatus so that the display image displayed by the display becomes an upright state for the user even when the user is inclined within the vertical plane with respect to the horizontal plane such that a line connecting a right eye and a left eye of the user is rotated within the vertical plane from a state where the user is upright such that the line is parallel to the horizontal plane.

* * * * *